US011281506B2

(12) United States Patent
Manula et al.

(10) Patent No.: US 11,281,506 B2
(45) Date of Patent: *Mar. 22, 2022

(54) VIRTUALISED GATEWAYS

(71) Applicant: Graphcore Limited, Bristol (GB)

(72) Inventors: Brian Manula, Stockholm (SE); Harald Hoeg, Oslo (NO); Ola Torudbakken, Oslo (NO)

(73) Assignee: GRAPHCORE LIMITED, Bristol (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/165,513

(22) Filed: Feb. 2, 2021

(65) Prior Publication Data
US 2021/0232443 A1 Jul. 29, 2021

Related U.S. Application Data

(63) Continuation of application No. 16/428,877, filed on May 31, 2019, now Pat. No. 10,956,234.

(30) Foreign Application Priority Data

Nov. 30, 2018 (GB) .................................. 1819616
Dec. 3, 2018 (GB) .................................. 1819728

(51) Int. Cl.
G06F 9/54 (2006.01)
G06F 9/455 (2018.01)

(52) U.S. Cl.
CPC .......... G06F 9/541 (2013.01); G06F 9/45558 (2013.01); G06F 9/544 (2013.01); G06F 2009/45579 (2013.01)

(58) Field of Classification Search
None
See application file for complete search history.

(56) References Cited

U.S. PATENT DOCUMENTS

| 9,135,037 | B1 * | 9/2015 | Petrescu-Prahova ....................... G06F 9/45558 |
| 10,089,009 | B2 * | 10/2018 | Glazemakers .......... G06F 3/061 |
| 10,361,992 | B2 * | 7/2019 | Ju ........................... H04L 29/06 |
| 10,606,641 | B2 * | 3/2020 | Knowles ............... G06F 9/4887 |
| 10,754,678 | B2 * | 8/2020 | Govardhan ......... G06F 9/45558 |
| 10,956,234 | B2 * | 3/2021 | Manula ............... G06F 9/45558 |
| 2014/0123135 | A1 * | 5/2014 | Huang ................ H04L 41/5096 718/1 |

(Continued)

OTHER PUBLICATIONS

Combined Search and Examination Report dated May 22, 2020 for Patent Application No. GB1819728.5.

*Primary Examiner* — Umut Onat
(74) *Attorney, Agent, or Firm* — Haynes and Boone, LLP

(57) ABSTRACT

A system comprising a gateway for interfacing external data sources with one or more accelerators. The gateway comprises a plurality of virtual gateways, each of which is configured to stream data from the external data sources to one or more associated accelerators. The plurality of virtual gateways are each configured to stream data from external data sources so that the data is received at an associated accelerator in response to a synchronisation point being obtained by a synchronisation zone. Each of the virtual gateways is assigned a virtual ID so that when data is received at the gateway, data can be delivered to the appropriate gateway.

31 Claims, 20 Drawing Sheets

(56) References Cited

U.S. PATENT DOCUMENTS

| | | | |
|---|---|---|---|
| 2014/0366155 A1* | 12/2014 | Chang | H04L 67/1097 726/27 |
| 2015/0016249 A1* | 1/2015 | Mukundan | H04L 41/5096 370/230 |
| 2015/0139229 A1* | 5/2015 | Kamble | H04L 69/18 370/390 |
| 2015/0169724 A1* | 6/2015 | Lin | G06F 9/542 707/737 |
| 2016/0019469 A1 | 1/2016 | Petrov | |
| 2018/0246768 A1* | 8/2018 | Palermo | H04L 67/12 |
| 2019/0044823 A1* | 2/2019 | Soundararajan | H04L 12/66 |
| 2019/0121668 A1* | 4/2019 | Knowles | G06F 9/3851 |

* cited by examiner

VIRTUALISED GATEWAYS

CROSS-REFERENCE TO RELATED APPLICATIONS

The present application is a continuation of U.S. patent application Ser. No. 16/428,877, filed May 31, 2020, which is now issued as U.S. Pat. No. 10,956,234 B1 with an issue date of Mar. 23, 2021, which claims priority to United Kingdom Patent Application No. 1819616.2, filed Nov. 30, 2018, and United Kingdom Patent Application No. 1819728.5, filed Dec. 3, 2018, the disclosures of which are incorporated herein by reference in their entireties.

TECHNICAL FIELD

The present disclosure relates to a gateway for use in a computer system to interface an external storage with a subsystem for acting as a work accelerator, and in particular to the provision of data to the accelerator for processing.

BACKGROUND

In the context of processing data for complex or high volume applications, a work accelerator may be a subsystem to which processing of certain data is offloaded from a host system. Such a work accelerator may have a specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a work accelerator specialised for machine intelligence applications may comprise a large degree of multi-threading. One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables data to be exchanged between them. Such an accelerator may function as a subsystem for a host system to perform parallel processing of data sets provided to it.

In general, there may exist dependencies between the portions of a program running on different tiles. A technique is, therefore required to prevent a piece of code on one tile running ahead of data upon which it is dependent being made available by another piece of code on another tile. There are a number of possible schemes for achieving this, one of which is described here by way of example, 'BSP', bulk synchronous protocol. According to BSP, each tile performs a compute phase and an exchange phase in an alternating cycle. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet proceed to the next compute phase. Further, according to the BSP principle, a barrier synchronization is placed at the juncture transitioning from the compute phase into the exchange phase, or transitioning from the exchange phase into the compute phase, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. In some scenarios a tile performing computation may be allowed to communicate with other system resources such as a network card or storage disk, as long as no communication with other tiles in the group is involved.

During an exchange phase, data exchange may not only take place internally (i.e. between tiles) within an accelerator, but in some circumstances may be required to take place between an accelerator and a further accelerator or between the accelerator and a host systems. When a subsystem acts as a work accelerator it is configured to process data sets provided to it (e.g. from a host system or from another form of storage in an extended system).

When scaling subsystems by connecting them together directly or indirectly, a problem may occur, which is how to improve the efficiency of allocation of processing resources of accelerators. The design of a gateway for interface the accelerator is relevant to determining how an accelerator's processing resources may be allocated between different applications, since the gateway supplies the data to the accelerator for processing. Having greater flexibility of data transfer may enable more efficient use of accelerator processing resources.

SUMMARY OF THE INVENTION

According to a first aspect, there is provided a system comprising a gateway for interfacing one or more external data sources with one or more subsystems for acting as work accelerators to the one or more external data sources, the gateway enabling the transfer of batches of data to the one or more subsystems at precompiled data exchange synchronisation points, wherein the gateway comprises: an accelerator interface for connection to the one or more subsystems to enable transfer of batches of data between the one or more subsystems and the gateway; a data connection interface for connection to the one or more external data stores for exchanging data between the gateway and the one or more external data stores; and at least one processor and at least one memory, the at least one processor in communication with at least one memory and being configured to provide a plurality of virtual machines or containers, each configured to provide data from at least one of the one or more external data sources to be received at least one of the one or more subsystems in response to a synchronisation point being obtained by a synchronisation zone comprising the gateway and the at least one of the one or more subsystems, wherein the at least one processor is configured to direct data received from one of the one or more subsystems or one of the one or more external data sources to at least one of the virtual machines or containers associated with the respective subsystem or respective external data source from which the data is received.

In some embodiments, the data received from one of the one or more subsystems or one of the one or more external data sources comprises at least one data packet comprising a virtual identifier, wherein the at least one processor is configured to direct the data to the at least one of the virtual machines or containers associated with the respective subsystem or respective external data source in response to determining that virtual identifier is associated with the at least one of the virtual machines or containers associated with the respective subsystem or respective external data source.

In some embodiments, the at least one processor comprises processing circuitry of at least one of the accelerator interface and the data connection interface, wherein said processing circuitry is configured to perform the directing of data to the at least one of the virtual machines or containers associated with the respective subsystem or respective external data source.

In some embodiments, the one or more subsystems comprises a plurality of subsystems, wherein at least one of the virtual machines or containers comprises a plurality of streaming engines, each being configured to provide data to different subsystems of the plurality of subsystems.

In some embodiments, each at least one virtual machine or container is configured to, in advance of the synchronisation point, access data from the at least one of the one or more external data sources and store said data in a memory of the gateway.

In some embodiments, each at least one virtual machine or container is configured to, in response to the synchronisation point being obtained, execute instructions to transfer data from memory of the gateway to the at least one of the one or more subsystems.

In some embodiments, the at least one of the one or more subsystems is configured to pull data from memory of the gateway in response to the respective synchronisation point being obtained.

In some embodiments, the plurality of virtual machines or containers comprises: a first virtual machine or container configured to transfer data from the at least one of the one or more external data sources to be received at a first of the one or more subsystems; and a second virtual machine or container configured to, during the transfer of data by the first virtual machine or container, transfer data from the at least one of the one or more external data sources to be received at a second of the one or more subsystems.

In some embodiments, the plurality of virtual machines or containers comprises: a first virtual machine or container configured to, during a first time period, transfer data from at least one of the one or more external data sources to be received at a first of the one or more subsystems; and a second virtual machine or container configured to, during a second time period subsequent to the first time period, begin transferring data from at least one of the one or more external data sources to be received at a first of the one or more subsystems.

In some embodiments, the first virtual machine or container is configured to during the second time period, cease transferring data from the at least one of the one or more external data sources to be received at a first of the one or more subsystems.

In some embodiments, the at least one processor is configured to repeatedly switch between the first virtual machine or container and the second virtual machine or container transferring data to the first of the one or more subsystems so that the first of the one or more subsystems is time shared between the first virtual machine or container and the second virtual machine or container.

In some embodiments, the plurality of virtual machines or containers comprises: a first virtual machine or container configured to transfer data from a first of the one or more external data sources to be received at least one of the one or more subsystems; and a second virtual machine or container instance configured to, during transfer of data by the first virtual machine or container, transfer data from a second of the one or more external data sources to be received at least one of the one or more subsystems.

In some embodiments, the second virtual machine or container is configured to, prior to transferring data from the second of the one or more external data sources, transfer data from the first of the one or more external data sources to be received at least one of the one or more subsystems.

In some embodiments, the first virtual machine or container and the second virtual machine or container belong to different virtual fabrics.

In some embodiments, the at least one processor is configured to insert an identification of a first virtual fabric into a data packet received at the accelerator interface from a first subsystem of the one or more subsystems, wherein the first subsystem belongs to the first virtual fabric.

In some embodiments, at least one subsystem of the one or more subsystems belongs to a first virtual fabric, wherein the at least one processor is configured to: check that a data packet for delivery to the at least one subsystem belonging to the first virtual fabric comprises an identifier of the first virtual fabric; and in response to determining that the data packet comprises an identifier of the first virtual fabric, send the data packet to the at least one subsystem belonging to the first virtual fabric.

In some embodiments, the one or more external data sources comprises one or more host devices.

According to a second aspect, there is provided a computer implemented method for transferring batches of data to the one or more subsystems at precompiled data exchange synchronisation points, the method implemented in a gateway for interfacing one or more external data sources with one or more subsystems for acting as work accelerators to the one or more external data sources, the gateway comprising: an accelerator interface for connection to the one or more subsystems to enable transfer of batches of data between the one or more subsystems and the gateway; and a data connection interface for connection to the one or more external data stores for exchanging data between the gateway and the one or more external data stores, wherein the method comprises: providing a plurality of virtual machines or containers, each configured to provide data from at least one of the one or more external data sources to be received at least one of the one or more subsystems in response to a synchronisation point being obtained by a synchronisation zone comprising the gateway and at least one of the one or more subsystems; and directing data received from one of the one or more subsystems or one of the one or more external data sources to at least one of the virtual machines or containers associated with the respective subsystem or respective external data source from which the data is received.

According to a third aspect, there is provided a non-transitory computer readable medium comprising computer readable instructions for causing the transfer of batches of data to the one or more subsystems at precompiled data exchange synchronisation points, the instructions being for execution by a gateway for interfacing one or more external data sources with one or more subsystems for acting as work accelerators to the one or more external data sources, the gateway comprising: an accelerator interface for connection to the one or more subsystems to enable transfer of batches of data between the one or more subsystems and the gateway; and a data connection interface for connection to the one or more external data stores for exchanging data between the gateway and the one or more external data stores, wherein the instructions are executable by at least one processor of the gateway to: provide a plurality of virtual machines or containers, each configured to provide data from at least one of the one or more external data sources to be received at least one of the one or more subsystems in response to a synchronisation point being obtained by a synchronisation zone comprising the gateway and at least one of the one or more subsystems; and direct data received from one of the one or more subsystems or one of the one or more external data sources to at least one of the virtual machines or containers associated with the respective subsystem or respective external data source from which the data is received.

BRIEF DESCRIPTION OF DRAWINGS

For a better understanding of the present invention and to show how the same may be carried into effect, reference will now be made by way of example to the accompanying Figures in which.

DETAILED DESCRIPTION

Embodiments of the application relate to a gateway for interfacing a host with a subsystem for acting as a work accelerator to the host. The subsystem may be referred to as the "accelerator" throughout the description. The gateway enables the transfer of batches of data to the accelerator at precompiled data exchange synchronisation points obtained by the subsystem. Each of these pre-complied data exchange synchronisation points acts as barrier between a compute phase and an exchange phase of the subsystem.

The following description explains various embodiments of the application in further detail. This application relates to a subsystem (referred to in the specification as the "accelerator") for acting as a work accelerator for a host system and to the combination of a plurality of such subsystems. The subsystems act as accelerators to perform predetermined processing steps on data sets (work) allocated by a host which is running a process requiring large amounts of data to be subject to mainly repetitive processing. Each subsystem may be a so called intelligence processing unit (IPU) or any other class of accelerator (XPU). The techniques described herein can be used with the IPUs described in our earlier U.S. application Ser. No. 15/885,925, the contents of which are herein incorporated by reference, but also can be applied to any accelerator. As will be described in more detail, several accelerators may be combined to form an accelerator machine or appliance. Several accelerator appliances may be combined in a chassis. Multiple chassis may be organised in groups, which can be arranged in a rack. The resulting combinations of accelerators can yield a system with a large amount of processing power for performing parallel operations. This is particularly useful for implementing neural network processing in artificial intelligence applications.

The application relates to a novel gateway which has a number of advantages in improving the effectiveness of such accelerators. The gateway(s) allow the disaggregation of the accelerators from the one or more host systems which provide the data sets for processing by the accelerators. This has several advantages. Firstly, it allows the number of accelerators per host to be user configurable and to be increased beyond the physical capacity of a host. Secondly, it allows the accelerator I/O to be decoupled from a host, enabling 10 capacity to scale as a function of the number of accelerators. Thirdly the disaggregation enables multiple hosts to use a set of accelerator resources which are allocated and grouped on demand to the hosts through a well-defined API that supports lifecycle management of these resources and associated hosts.

Figure 1:
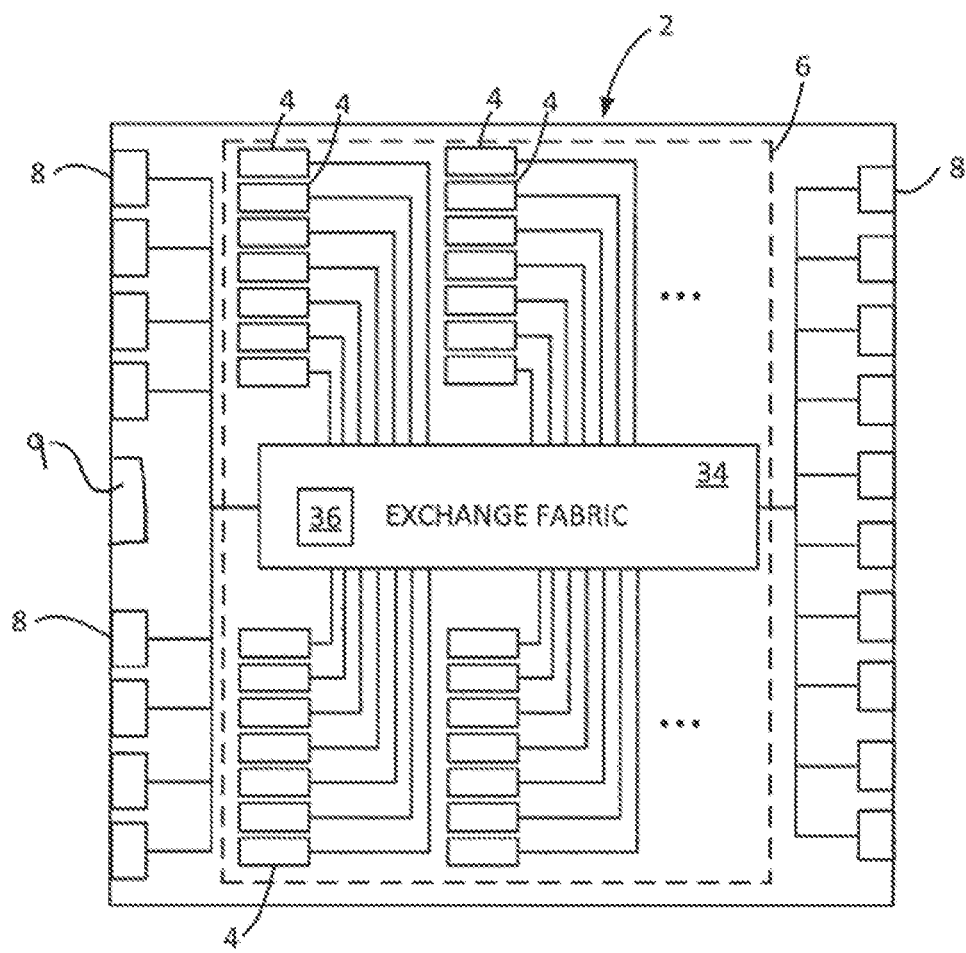
FIG. 1 is a schematic block diagram of a processor chip comprising multiple tiles.

Each accelerator may be a single chip processor. FIG. 1 shows a single chip processor 2, i.e. a single die, comprising an array 6 of multiple processor tiles 4 and an on-chip interconnect 34 connecting between the tiles 4. The chip 2 may be implemented alone on its own single-chip integrated circuit package, or as one of multiple dies packaged in the same IC package. The on-chip interconnect may also be referred to herein as the "exchange fabric" 34 as it enables the tiles 4 to exchange data with one another. Each tile 4 is a processing unit capable of executing instructions (code) from a local instruction memory and handling data in local data memory. A tile 4 may comprise a respective instance of a barrel-threaded processing unit 10 and a memory 11. For instance, by way of illustration the chip 2 may comprise of the order of hundreds of tiles 4, or even over a thousand. For completeness, note also that an "array" as referred to herein does not necessarily imply any particular number of dimensions or physical layout of the tiles 4.

Figure 12:
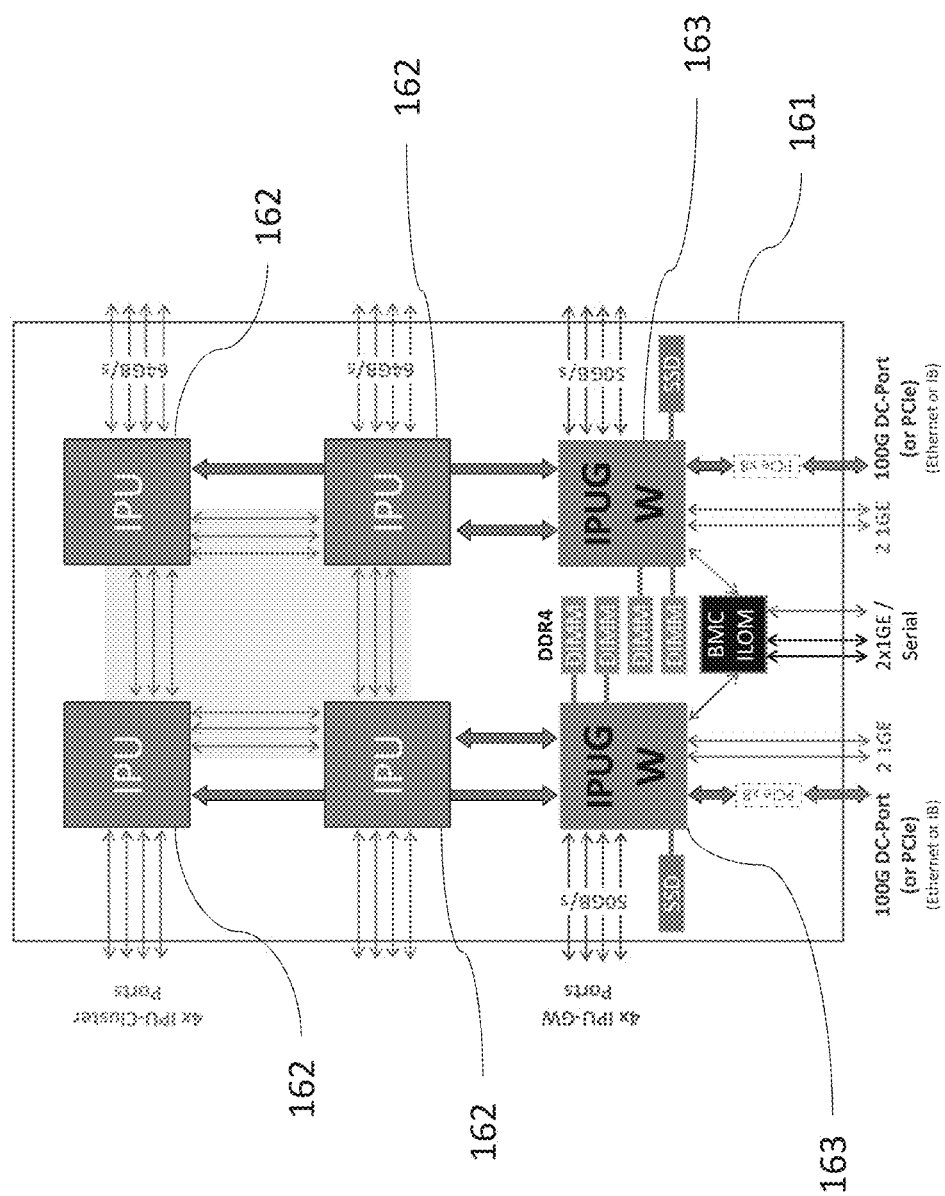
FIG. 12 is a schematic illustration of a machine including a plurality of accelerators and gateways.

Each chip 2 also comprises one or more external links 8, enabling the chip 2 to be connected to one or more other, external processors on different chips (e.g. one or more other instances of the same chip 2). These external links 8 may act as chip-to-chip links for connecting together with one or more other instances of the chip 2 on the same IC package or card, or on different cards. Multiple instances of the chip 2 can be connected together into cards by chip-to-chip links (as shown in FIG. 12 described later). The chip also has a connector 9 which connects the chip to a gateway, which is described in detail later. Note that not all accelerators need to have a gateway connector 9, but at least some do for the purposes described herein. In one example arrangement, the chip 2 receives work from the gateway allocated by a host, in the form of input data to be processed by the chip 2. Note that references to the host may instead imply a reference to an off chip storage system such as network attached storage (NAS). The gateway enables a host (or NAS) to access one or more accelerators, which are designed as a single chip processor 2 or as multiple single chip processors 2, possibly arranged on multiple interconnected cards. The gateway enables relay and disaggregation between accelerator and hosts as detailed later.

The interconnect 34 is configured to enable the different processor tiles 4 in the array 6 to communicate with one another on-chip 2. In the IPU described in our earlier patent applications, communication between tiles 4 on the accelerator 2 occurs in a time deterministic fashion. However, other forms of inter tile exchange are possible. There may be dependencies between the portions of the program running on different tiles 4 in the array 6. That is, processing data on one tile may depend on results from another tile, e.g. may provide results on which another tile depends. A technique is therefore required to prevent a piece of code on one tile 4 running ahead of data upon which it is dependent being made available by another piece of code on another tile 4.

Parallel programming models for AI and Data Science usually follows a 3-phase iterative execution model: Compute, Barrier, and Exchange. The implications are that data transfer to and from an accelerator is usually barrier dependent to provide data-consistency between the accelerators and between each accelerator and the host. Typically used data consistency models are Bulk Synchronous Parallel (BSP), Stale Synchronous Parallel (SSP) and Asynchronous.

In SSP, the faster worker thread of a plurality of worker threads is allowed to run ahead of the slowest work thread by a number of clock cycles. A worker thread is able to see updates made to a shared parameter having a range of time stamps. For example, a worker at clock t is able to see all updates from workers up to those updates that are time-stamped at t−Δ. BSP is a special case where Δ=0 and therefore the workers may not run ahead of each other.

In the Asynchronous data consistency model, the shared parameters may be read and/or written to at any time.

Embodiments of the invention described herein use a BSP model, but it will be apparent that the other synch models could be utilised as an alternative.

Figure 2:
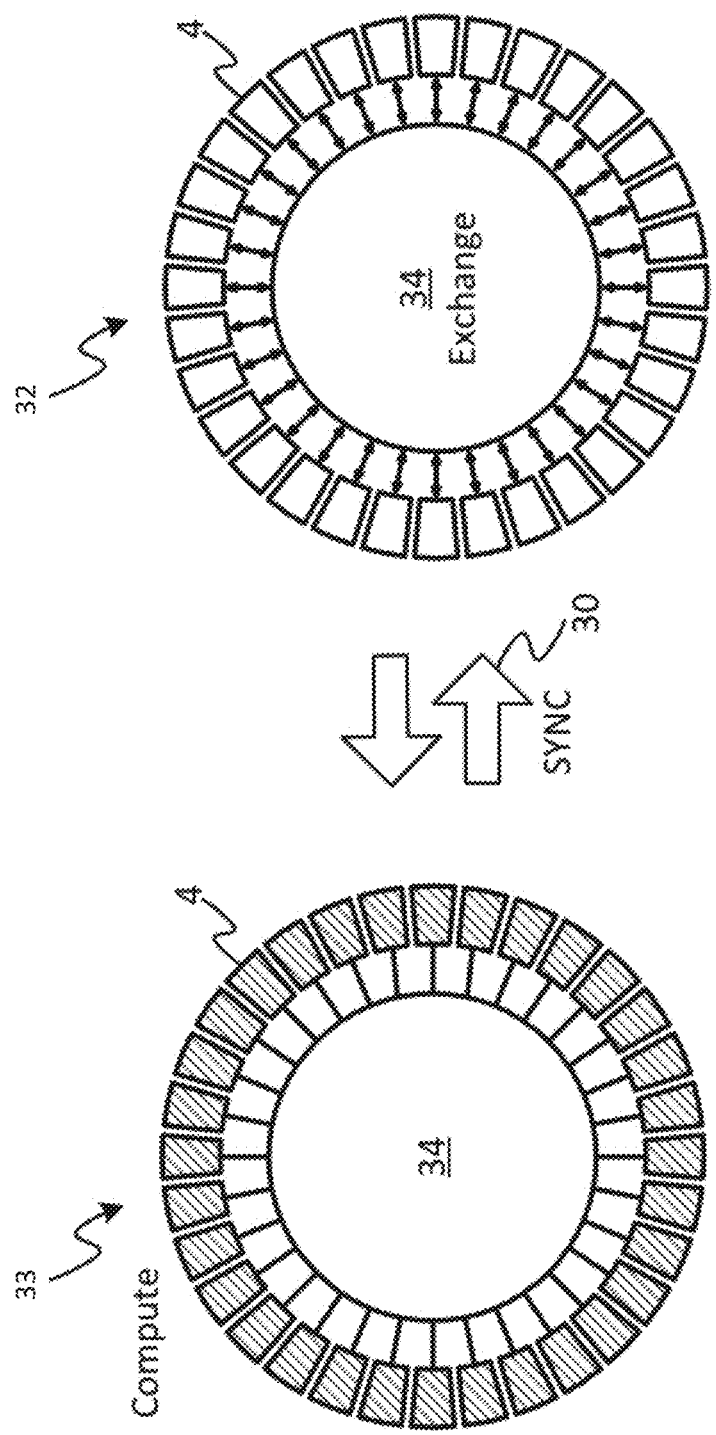
FIG. 2 is a schematic illustration of a bulk synchronous parallel (BSP) computing model.
Figure 3:
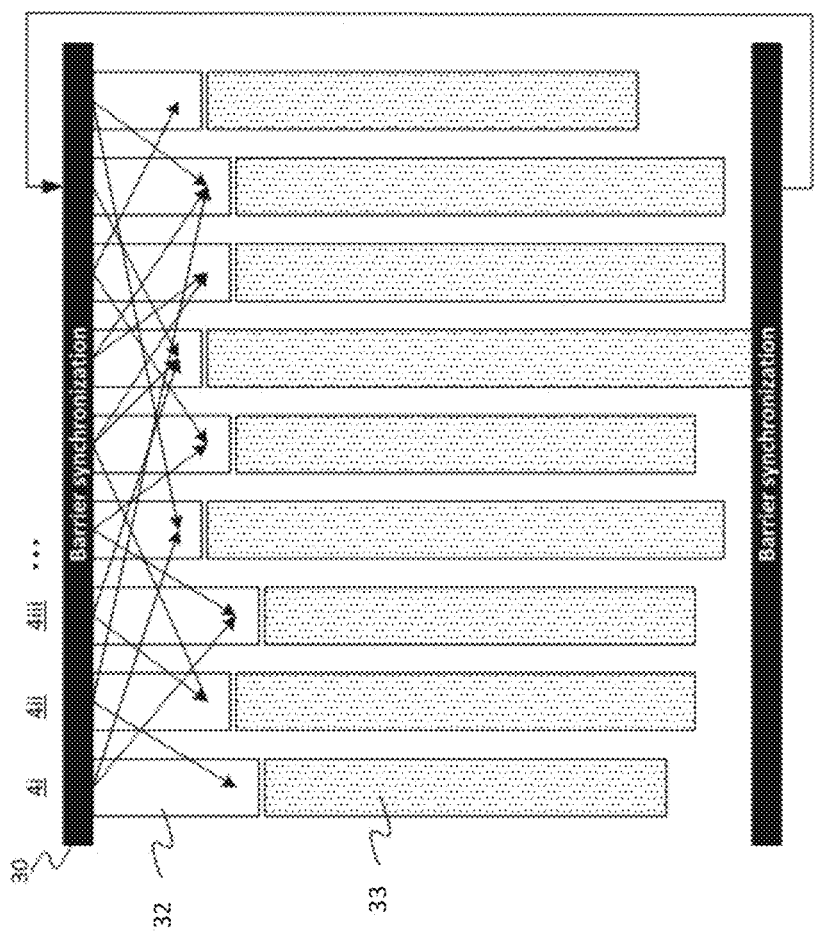
FIG. 3 is another schematic illustration of a BSP model.

Reference is made to FIGS. 2 and 3, which illustrate an implementation of a BSP exchange scheme in which each tile 4 performs a compute phase 33 and an exchange phase 32 in an alternating cycle, separated from one to the other by a barrier synchronization 30 between tiles. In the case illustrated by FIGS. 2 and 3, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles, but does not perform any new computations until it has received from other tiles 4 any data on which its task(s) has/have dependency. Neither does it send to any other tile, any data except that computed in the preceding compute phase. It is not excluded that other operations such as internal control-related operations may be performed in the exchange phase. Note also that a tile 4 performing computation may be allowed during the compute phase 33 to communicate with the gateway which is external to the array of tiles 4 being synchronized—as long as this does not involve communication with other tiles 4 within the group being synchronized. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual processors which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same chip 2 or different chips could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later FIG. 2 illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that in this arrangement, some tiles 4 are allowed to begin computing 33 whilst some others are still exchanging.

According to embodiments disclosed herein, this type of BSP may be facilitated by incorporating additional, special, dedicated functionality into a machine code instruction for performing barrier synchronization, i.e. the sync instruction. The sync instruction may be executed on the processor of the tile, so as to start an exchange phase in which data is exchanged to cause synchronisation of data stored in memories of the tiles.

A sync instruction has an operand which defines the sync mode. One such mode is an inter-tile mode sync chip, which causes all tiles on a chip to reach a synchronisation banner for data exchange. This is managed by a compiler when the instructions for each tile are compiled, as each tile is executed according to a pre-deterministic time based compiling protocol.

As mentioned it is possible to combine several accelerators, e.g. IPUs, to produce an accelerator machine 161 having improved processing power compared to a single accelerator. Such an accelerator machine 161 is illustrated in FIG. 12. The accelerator machine 161 comprises a plurality (in this example four) of accelerators 162 connected in an array with each accelerator connected to its neighbour by links 8. The machine 161 also comprises two gateways 163 that are configured to connect the machine 161 to one or more hosts (not shown). Each gateway 163 is connected to two of the four accelerators 162 via gateway links 9.

As will be explained in further detail, the gateways 163 are able to exchange data with their connected accelerators 162 in the exchange phase, following a data exchange synchronisation point. The data exchange synchronisation point is triggered as a result of the execution of the sync instructions that are part of the pre-compiled code running on the accelerators. At the start of the data exchange synchronisation point, a sync instruction may be executed on the processor of a tile. The execution of one or more sync instructions by one or more tiles of an accelerator 162 causes one or more sync requests to be issued by the one or more tiles. These sync requests are aggregated by the accelerator 162, which then issues an aggregated sync request to its associated gateway 163. The gateways may be connected to transmit synchronisation signals between them to enable synchronisation zones to be formed of multiple gateways and accelerators. One function of the synchronisation signals is to facilitate data exchange between the gateways 163 and the associated accelerators 162 in the exchange phase of a BSP model, but they have other non-data related applications. Each gateway 163 has a local memory and is configured to obtain (from the host, from remote storage, or from another gateway) and store data to be sent to the accelerators at a data exchange synchronisation point. The data is stored in the local memory in advance of a sync request from the accelerator 162 so that it is ready to be transferred to the accelerator. One function of the gateway is to supply requested data to the accelerator when the accelerator needs it. Data can be obtained by the gateway from the host or remote storage by different mechanisms as discussed later.

Each gateway 163 is also configured to exchange data with other gateways. A gateway 163 may distribute copies of data to be sent to the accelerators 162 to other gateways. These other gateways 162 may then distribute data to the accelerators 162 to which they are connected. Therefore, the other gateways 162 receiving the copies of the data need not independently obtain the data from storage (e.g. host or remote storage), thereby preventing redundant data from being retrieved from a storage by multiple gateways. This is described in more detail later. Furthermore, as will be described in more detail later, a gateway 163 is configured to enable a plurality of different types of data transfer. A gateway 163 is configured to exchange data with other gateways. A gateway 163 is configured to exchange data with one or more accelerators 162 to which it is coupled. A gateway 163 is configured to exchange data with one or more hosts (not shown).

Figure 4:
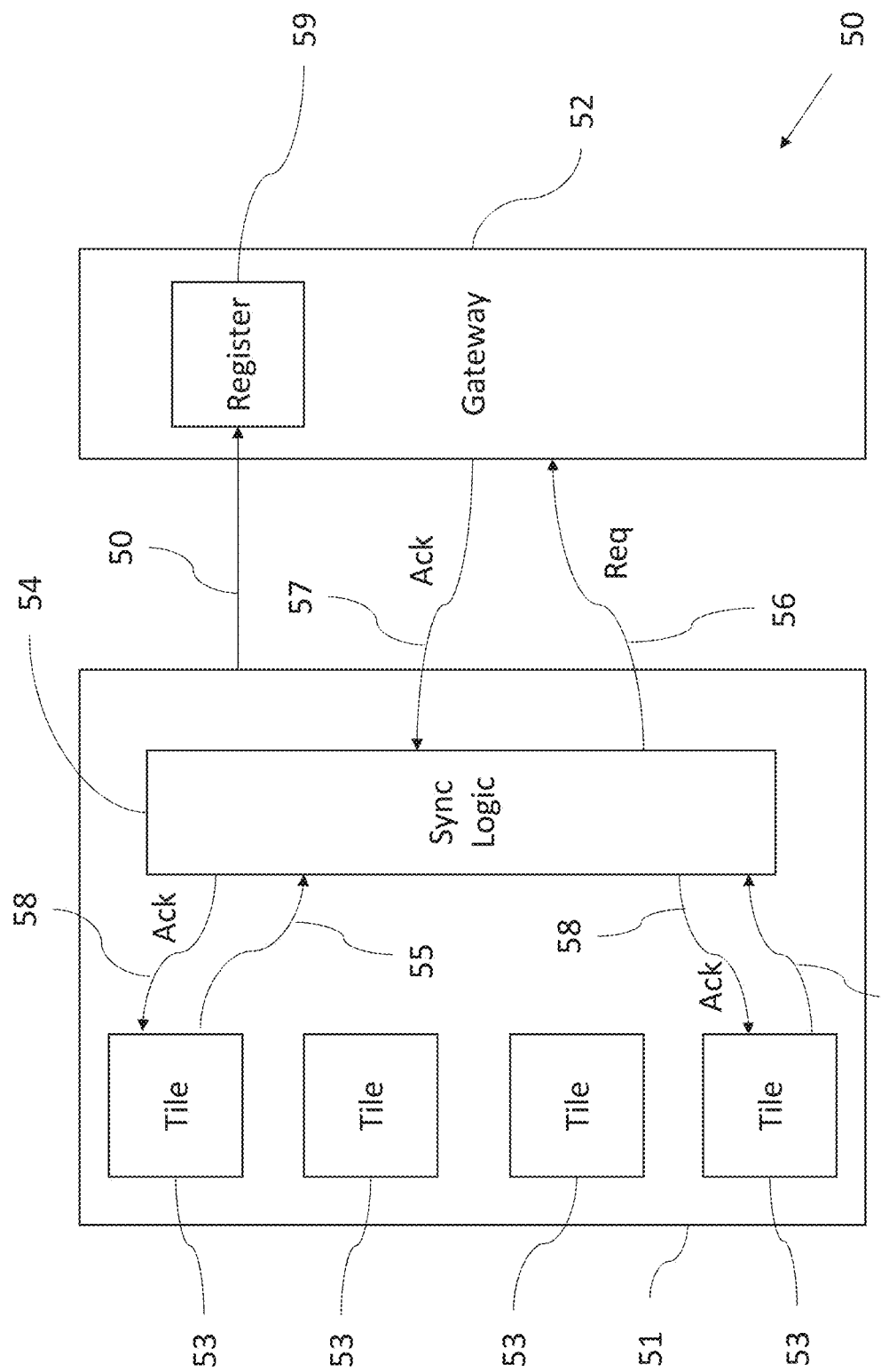
FIG. 4 is a schematic illustration of the exchange of synchronisation requests/acknowledgments between an accelerator and a gateway.

Reference is made to FIG. 4, which illustrates an example of how the sync request/acknowledgment mechanism works in the case that one or more tiles 53 of the accelerator 51 issue requests for synchronisation to the gateway 52.

The gateway 52 comprises a register 59 that comprises an indication of a sync zone for an upcoming synchronisation to be carried out. The register 59 may be implemented in a shared register block (SRB) in the gateway 52. Prior to a barrier synchronisation, a tile 53 of the accelerator 51 is configured to transmit an indication 32 of the sync zone to which it belongs for the upcoming synchronisation. Since many of the tiles 53 of the accelerator 51 may belong to the same sync zone, the accelerator 51 nominates a tile belonging to the particular sync zone for writing the indication 32. The sync zone indicates which tiles are to be involved in a synchronisation together. In some cases, a sync zone may only comprise tiles 53 on the same chip. In other cases, a sync zone may be an external sync including tiles 53 on different chips. In some cases, a sync zone includes tiles on a different accelerator. In some cases, a sync zone includes the gateway/s, host and/or remote storage.

Although the indication of the sync zone is here presented as being transmitted from the accelerator 51 to the gateway 52, in some other embodiments, the indication may be determined by the gateway 52 and stored in the register 59. The gateway 52 may make this determination autonomously on the basis of its pre-compiled code. In some other embodiments, the indication may be provided as part of the sync request 56 that is received from the accelerator 51, or part of the out of band (e.g. PCIe write) sync information provided before the sync request is asserted.

The data exchange synchronisation point is triggered as a result of the sync instructions pre-compiled in the code running on the tiles 53 of the accelerator 51. At the start of the data exchange synchronisation point, one or more sync instructions may be executed on the processors of one or more of the tiles 53. Each tile which executes a sync instruction transmits a sync request, which is received at sync logic 54 of the accelerator 51. The sync logic 54 aggregates these sync requests 55 and transmits the aggregated sync request 56 to the gateway 52.

The gateway 52 receives from the accelerator 51, the sync request 56, and may allow the synchronisation barrier to be passed. This involves transmitting a sync acknowledgment 57 to the accelerator 51 in response to the sync request 56. Allowing the synchronisation barrier to be passed causes the tiles 53 of the accelerator 51 to exchange data with each other and, in some circumstances, with the gateway 52 itself. The data exchange with the gateway 52 may involve data received at the gateway 52 from the host (not shown) being transferred to one or more tiles 53 of the accelerator 51. The data exchange with the gateway 52 may involve data received at the gateway 52 from another gateway (not shown) being transferred to one or more tiles of the accelerator 53. The data received from the other gateway may have originated from another accelerator. This is one mechanism by which data exchange between accelerators may be achieved via the gateways. The data received from the other gateway may have originated from another host. Another mechanism is through a facility of the gateways to enable one accelerator connected to a gateway to write directly to another accelerator connected to another gateway, via a fabric port between the gateways. To achieve this, all storage locations in each grouping of accelerators/gateways (i.e. chassis/group/rack etc) form part of a single global address space.

The gateway 52 has three data exchange boundaries: (i) gateway-accelerator; (ii) gateway-external. (iii) gateway-gateway. These have different requirements and therefore are managed by different protocols. However, they have to be co-ordinated such that accelerator 51 data is available in gateway memory when it is requested (i.e. on sync) by an accelerator 51, but that the gateway memory which stores data for the gateway 52 does not overflow.

As mentioned, prior to the synchronisation, an indication is stored in the register 59 as to the sync zone for a group of tiles 53 of the accelerator. The write 50 to this register 59 is preferably made prior to the issuance of the sync request 56 to the gateway 52. Preferably, the tile would transmit the indication at the end of the previous exchange phase or at the beginning of the compute step preceding the exchange phase in which the corresponding synchronisation will take place. A separate write 50 to the register 59 is carried out for each synchronisation barrier. Upon receiving a sync request 56, the gateway 52 is configured to consume from the register 59, the indication corresponding to the sync request. The gateway 52 is configured to only transmit the acknowledgment 57 for the sync request to the accelerator 51 if an indication corresponding to the sync request 56 has been written to the register 59. In other words, the gateway 52 will only transmit the acknowledgment 57 for the sync request to the accelerator 51 if the value has been refreshed since the last barrier.

If there is a delay in the writing to the register 59 of the indication of the sync zone—because, for example, one or more tiles 53 of the accelerator are unable to determine their sync zone until the end of the compute phase—then the sync request may be received before the register is updated with the corresponding indication of the sync zone. In this case, the gateway 52 waits to transmit the acknowledgment 57 until the register 59 receives the corresponding indication of the sync zone. The system may, therefore, be subject to a small latency whilst waiting for the register 59 to be refreshed.

The gateway 52 uses the indication of the sync zone that is stored in the register 59 to generate and transmit the sync acknowledgment 57 to the correct tiles, chips and/or accelerators. For example, if the indication of the sync zone is that the sync zone includes the accelerator 51 and, additionally, a further accelerator (not shown), the gateway 52 transmits a sync acknowledgment to the accelerator 51 and to the further accelerator in response to receipt of the sync request. The gateway 52 may transfer data between the accelerator 51 and the further accelerator. If the indication of the sync zone is such that the sync zone includes a subset of tiles of the accelerator, the sync acknowledgement 57 is transmitted by the gateway to that subset of tiles. In response to receiving the sync acknowledgment 58, the subset of tiles exchange data during the synchronisation. Thus, the gateway 52 may read the indication of the sync group from the register 59 and in dependence on this indication, propagate the sync acknowledgment 57 accordingly.

The indication of the sync zone that is stored in the register 59 comprises an indication of whether or not data transfer from the gateway 52 itself is required as part of the synchronisation. This indication may be implicit from the indication of the sync zone stored in the register 59. If the gateway 52 determines that data transfer is required, the gateway 52 then applies a credit control mechanism to determine whether or not to allow the synchronisation barrier to be passed. If the gateway 52 determines that data transfer is not required, the gateway 52 transmits the sync acknowledgment 57 to the accelerator 51 without applying the credit control mechanism. For the credit control mechanism, if there are one or more of a first set of credits (referred to as ESP (exchange synchronisation point) credits) available in a storage (the Local Sync Barrier Module (LSBM), to be described later of the gateway 52, then the gateway 52 is configured to allow the synchronisation barrier to be passed in response to receipt of the sync request 56 by transmitting the sync acknowledgment 57 to the accelerator 51 and transferring the data of the synchronisation to the accelerator 51 from gateway memory (not shown in FIG. 4). If there are zero of the ESP credits available, the gateway 52 will acknowledge 57 the synchronisation request 56 and will not transfer the data from the gateway memory (not shown in FIG. 4) to the accelerator 51 thus causing the synchronisation to stall. This credit control mechanism, which is described in more detail below, allows the gateway 52 and the accelerator 51 to remain synchronised in the BSP protocol with respect to one another.

In some embodiments, the gateway 52 and accelerator 51 each comprise pre-compiled code, allowing the gateway 52 to provide the required data to the accelerator 51 at the correct time.

After the sync logic 54 of the accelerator 51 has transmitted the sync request 56, the sync logic 54 will await the sync acknowledgment (sync_ack) 57 from the gateway 52. When the sync logic 54 of the accelerator 51 receives the sync acknowledgement 57 from the gateway 52, it will return the sync acknowledgment signal 57 (sync_ack) to the tiles 53 that issued the sync requests 55. All the tiles 53 will be automatically paused until the sync acknowledgment 58 (sync_ack) from the external sync logic 54 is returned. In response to the sync acknowledgement 58, the tiles 53 resume instruction issue for the supervisor, i.e. they re-enter the compute phase.

The actual data (content) is transmitted between the accelerator tiles 53 and the gateway 52 by a different channel to the sync requests 55/56 and the sync acknowledgements 57/58. Further, it will be appreciated that the skilled person will be capable of building different types of circuits for implementing the disclosed synchronization and aggregation functionality given the specification of that functionality disclosed herein. For instance, the synchronisation logic 54 could use dedicated wiring for transmitting the sync requests 56 and sync acknowledgments 57/58. The synchronisation logic 54 could instead use packets carried over an interconnect as an alternative to dedicated wiring. For example, the sync request 55/56 and/or the sync acknowledgment 57/58 could each be transmitted in the form of one or more packets. For example, the sync request 55/56 and/or the sync acknowledgement 57/58 could each be transmitted in the form of one or more packets Reference is made to FIG. 5, which illustrates, in more detail, the concept of sync zones.

Figure 5:
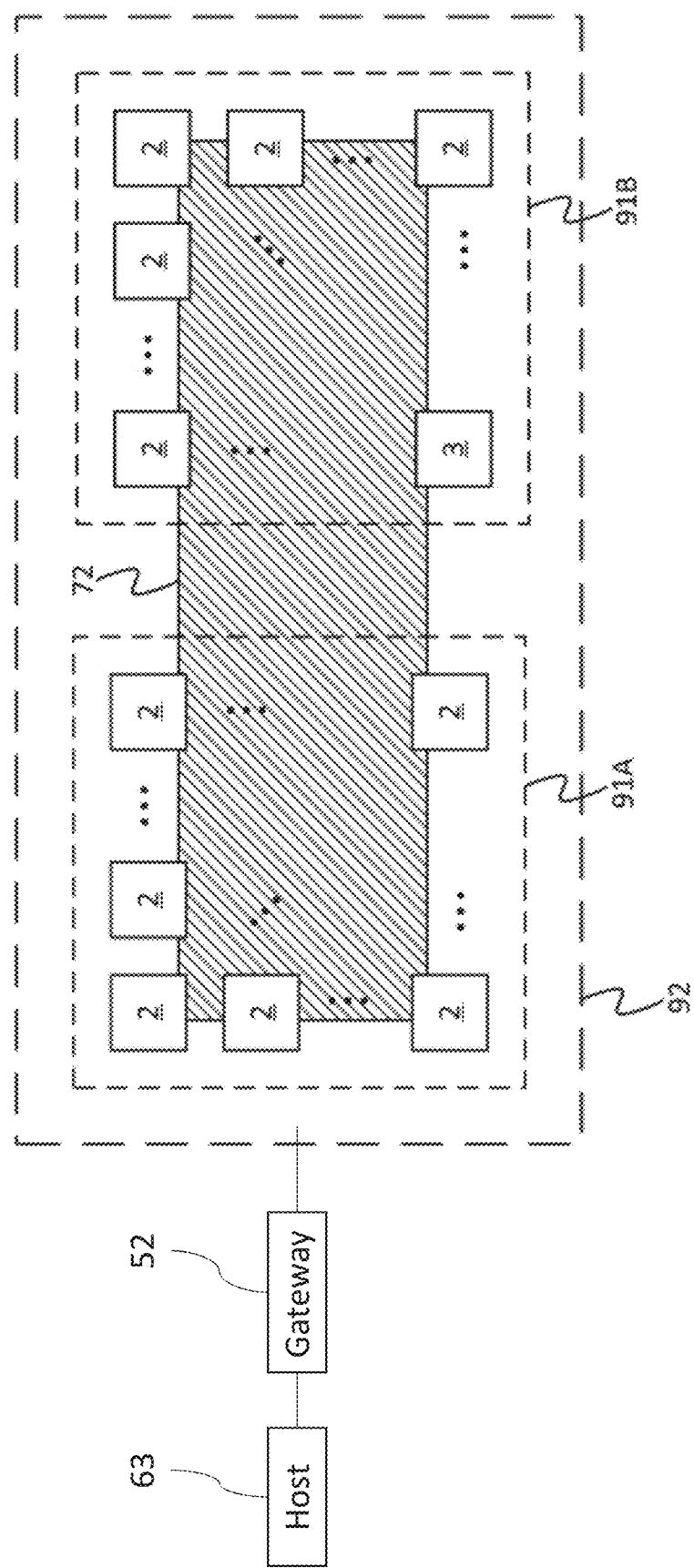
FIG. 5 is another schematic illustration of a system of multiple processor chips.

As illustrated in FIG. 5, in embodiments the indication of the sync zone that is written to the register 59 of the gateway 52 can be used to specify one of multiple different possible external sync zones, e.g. zone_1 or zone_2. In embodiments, these correspond to different hierarchical levels. That is to say, each higher hierarchical level 92 (e.g. zone 2) encompasses two or more zones 91A, 91B of at least one lower hierarchical level. If the indication of the sync zone in the register 59 indicates the lower hierarchical level of the external sync zone (sync zone_1), then the above-described sync and aggregation operations are performed in relation to the tiles 4 on the chips 2 in only the same lower-level external sync zone as the tile on which the sync instruction was executed. If the indication in the register 59 indicates the higher hierarchical level of external sync zone (sync zone_2), then the above-described sync and aggregation operations are automatically performed in relation to all the tiles 4 on all the chips 2 in the same higher-level external sync zone as the tile on which the sync instruction was executed.

The indication may indicate gateway involvement (i.e. that data is to be transferred between gateway 52 and the accelerator 51) for the synchronisation. The indication may indicate involvement of a further gateway other than gateway 52, where the accelerator 51 may communicate with the further gateway via the gateway 52. Therefore, when a corresponding sync instruction is executed, the tile 53 which executes this sync instruction will be synchronised with the host 63 via data transfer with the gateway 52. In the case where, a further gateway is indicated for involvement, the sync request from the accelerator 51 may be passed (after being aggregated with other sync requests received at the gateway 52) upstream to the further gateway. The gateway 52 awaits a sync acknowledgment from the further gateway, before providing the sync acknowledgment to the accelerator. This scenario is described in more detail later with respect to FIG. 8.

In response to the indication in the register 59 indicating an external sync zone, the gateway 52 transmits a sync acknowledgment 57 to the tiles of the external sync zone. The dedicated hardware sync logic 54 in the external interconnect receives the sync acknowledgment (sync_ack) 57 from the gateway and transmits the sync acknowledgement 58 to the tiles 4 of the indicated group. The sync logic 54 will return the sync acknowledgment signal 58 (sync_ack) to the tiles in the signalled sync zone only once a synchronization request (sync_req) 55 has been received from all the tiles 4 in that zone (but will not wait for any other tiles outside that zone if it is not a global sync).

Note that in other embodiments, the sync zones that can be specified by the indication in the register 59 are not limited to being hierarchical in nature. In general, the indication in the register 59 may be provided with modes corresponding to any kind of grouping. For instance, the modes may enable selection from amongst only non-hierarchical groups, or a mixture of hierarchical groupings and one or more non-hierarchical groups (where at least one group is not entirely nested within another). This advantageously enables the flexibility for the programmer or compiler, with minimal code density, to select between different layouts of internally-synchronous groups that are asynchronous with respect to one another.

Figure 6:
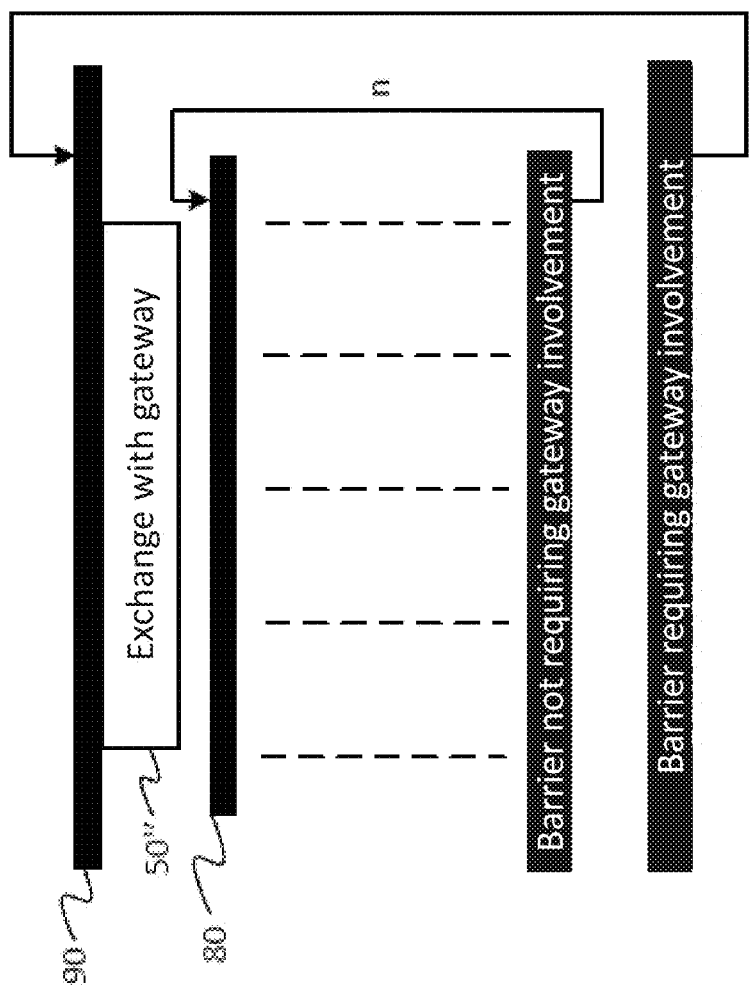
FIG. 6 schematically illustrates a program flow involving synchronisation with host.

As explained, some synchronisation barriers involve synchronising tiles of an accelerator with data from the host, whereas some synchronisation barriers do not. An example is illustrated schematically in FIG. 6 for the global sync zone 92. The system is allowed to perform n supersteps, passing through N sync barriers 80, before a barrier 90 also requiring synchronisation with the host 63 is imposed. At the synchronisation barrier 90 with the host 63, data, which has been transferred to the gateway 52 from the host 63, is transferred to the accelerator 51 from the gateway 52. The n sync barriers require sync requests from all the (non-abstaining) tiles 4 in the relevant sync group 92 but not the host 63. The subsequent sync barrier 80 requires sync requests from all the (non-abstaining) tiles 4 in the sync group 92. Furthermore, to pass the sync barrier 80 requires that the gateway stores a sufficient number of ESP credits to pass the particular barrier. After this barrier 90, an exchange 50" may be performed between the gateway and one or more of the tiles 4, e.g. for one or more of the tiles 4 to report computation results to the host 63.

Figure 7:
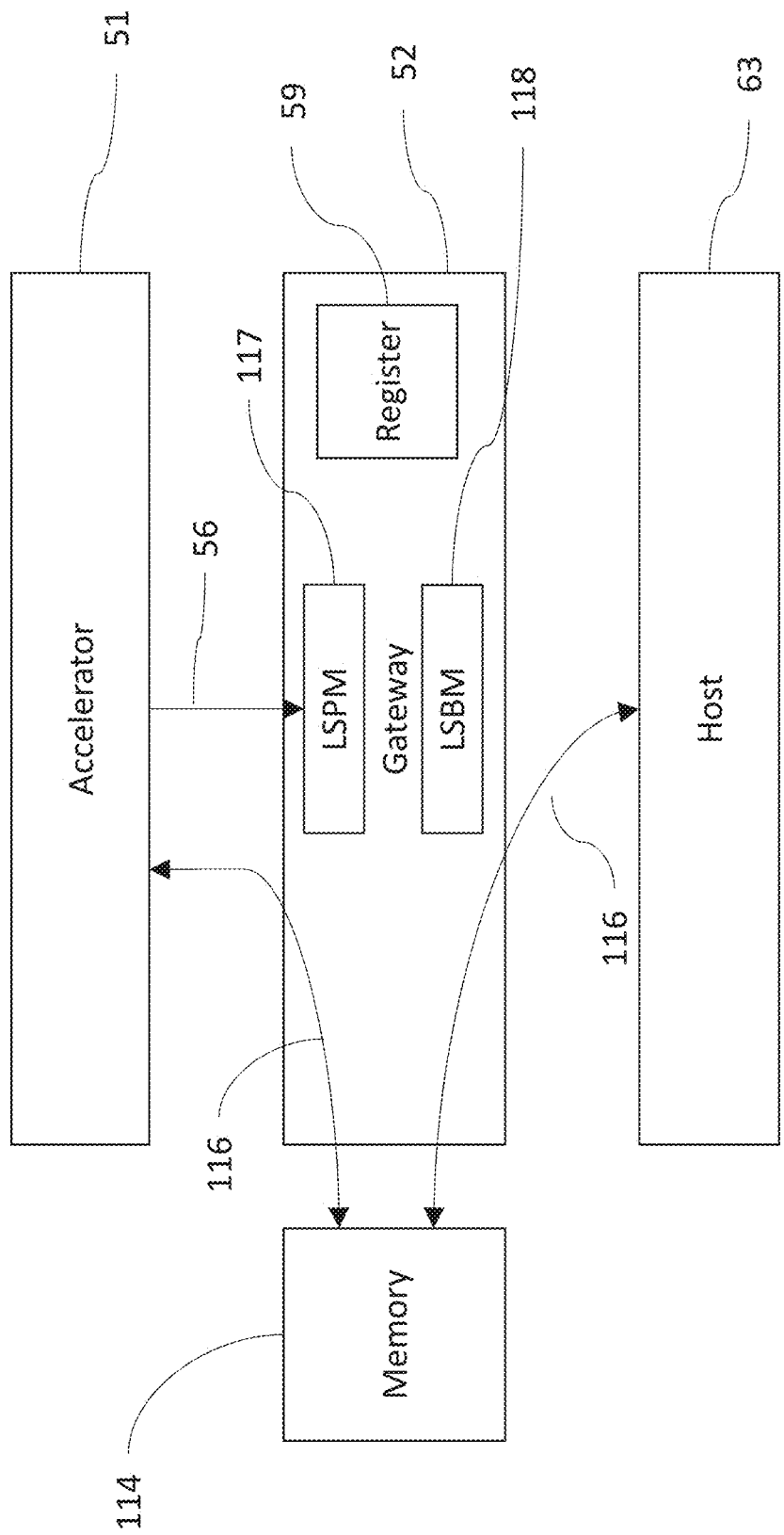
FIG. 7 schematically illustrates a system including an accelerator, gateway, and host.

Reference, is now made to FIG. 7, which illustrates in further detail how a host 63 interacts and exchanges data with an accelerator 51. The host 63 is configured to provide data for the accelerator 51 to process. The accelerator 51 is configured to process the data and deliver the results of the processing to the host 63. The gateway 52 is responsible for streaming data in a managed fashion between the host 63 and the accelerator 51 for the exchange of data. In the example, the accelerator 51 may be an IPU as described above with reference to the preceding Figures. However, the gateway 52 may be useable for interfacing a host 63 with other types of accelerator 51.

Data synchronisation between host 63, gateway 52 and accelerator 51 through Exchange Synchronisation Points ensures gateway data consistency and readiness for I/O operations. The availability of data between gateway 52 and accelerator 51 is handled via a credit mechanism of ESP credits. One credit allows one ESP to be passed. The gateway memory 114 preparation, ahead of an ESP, is handled by the gateway 52 executing "pre-work" instructions. The data handling after the ESP is performed by executing "post-work" instructions. A PPE execution engine 123, described later, executes the pre- and post-work instructions.

As shown in FIG. 7 (and referring also to FIG. 5), the gateway 52 comprises at least one "Local Sync Propagation Module" (LSPM) 117 and at least one "Local Sync Barrier Module" (LSBM) 118. The LSBM 118 can be considered as a kind of proxy to the PPE and enables the program running on the accelerators to process batches of data to be decoupled from the host. The accelerator 51/gateway 52 synchronisation can run asynchronously from the host 63 activity in providing data to the gateway 52. The LSBM 118 is configured to store the ESP credits discussed above. The LSBM is accessible to the LSPM 117

The LSBM 118 comprises hardware circuitry configured to enable the host 63 to participate in the respective sync group 92 in which the LSBM 118 is arranged to act as the host's proxy. [Q—Is this correct?] A sync request 56 emitted by the tiles 4, if it is a sync with gateway involvement, will be using both the LSPM 117 and LSBM 118 of the gateway 52 whereas a sync request 56 for a sync which does not involve transfer of data between gateway 52 and accelerator 51 will be received by the LSPM 117 and returned to the requesting tiles without involving the LSBM 118. Thus the tiles 4 determine by virtue of the program they execute when, if at all, the accelerator 51 requires to interact with the host 63 via the LSBM 118.

If the accelerator 51 requires to interact with the host 63, the LSBM 118 is then configured to allow the synchronisation barrier to be passed when a sync request 56 is received, providing the number of ESP credits is greater than zero. Allowing the synchronisation barrier to be passed involves generating a sync acknowledgement (not shown) and sending this sync acknowledgment to the accelerator 51.

As explained above, the gateway 52 stores a set of credits associated with the interface between itself and the accelerator 51. These credits are referred to in the description as exchange synchronization points (ESP) credits. However, the skilled person would understand that this name is used to conveniently identify the credits only and does not imply a limitation as to the nature of the credits. The ESP credits may also be referred to as barrier credits, since they control whether or not a data exchange operation may be executed for one barrier.

If the number of ESP credits in the LSBM 118 is zero, when a sync request 56 is received and the corresponding indication in the register 59 is such that data transfer with the gateway is required, the LSPM 117 does not allow the synchronisation barrier to be passed and therefore does not allow the tiles 4 in the group 92 to continue running again until the number of ESP credits is greater than zero. The generation of ESP credits may be achieved when data, which is for transfer to the accelerator 51 at the exchange synchronisation point, becomes available in the gateway 52. In some cases, this data may become available as a result of it being transferred from the host 63 or network attached or other external storage. In other cases, this data may become available as a result it being transferred from another gateway. The data received from the other gateway may be data from another accelerator or from another host or remote storage.

In some embodiments, there may be a plurality of sets of ESP credits held by the gateway 52. There may be different sets of credits for different sync groups. In this case, a sync request 56 corresponding to one sync group may cause the gateway 52 to acknowledge the request (if the number of ESP credits for that group is non-zero), whereas a sync request 56 corresponding to another sync group may not cause the gateway 52 to acknowledge the request (if the number of ESP credits for that group is zero). There may also be different sets of credits for the different accelerators configured to communicate with the gateway 52. As shown in FIG. 12, each gateway 163 is configured to communicate with two accelerators 162, and therefore, the gateway 52 may store two sets of ESP credits for each accelerator 162. If each accelerator 162 has two possible sync groups requiring gateway data transfer, this leads to four sets of credits in total being held by each gateway 163.

Tiles 4 of a sync group can be allowed to continue running through n barriers synchronized (with sync requests being forwarded to and acknowledged by the LSPM 117) without deferring at all to the host 63, after which they must then synchronize with the host 63 via the LSBM 118 (and may then exchange data to and/or from the host). See for example FIG. 6.

As explained above, the software running on the tiles 4 is programmed to request a sync with the host by transmitting an indication (which may be included in the sync request or transmitted separately) as to whether or not gateway involvement is required for the sync. This indication is stored in register 59 of the gateway 52. In such embodiments, the above described credit control mechanism is applied only by the LSBM 118 for the barriers corresponding to syncs marked as requiring gateway involvement (the "involvement" of the gateway for any given barrier being either the proxy granting (LSBM) of the sync ack by the LSPM 118 on behalf of the host, or occasionally the explicit granting of more ESP credits to LSBM 118). In embodiments, the gateway involvement is selected by different variants of the sync zone indication that is stored in the register 59. That is, for each sync group 91, 92, there is effectively two variants that the sync zone indication can take: zone_1_host, zone_1_no_host; and zone_2_host, zone_2_no_host. The execution unit of the tile is configured to cause the synchronization logic 54 to signal the gateway involvement marker accordingly. In other embodiments however, it is not excluded that other mechanisms could be implemented for requesting gateway involvement, or even (though less preferred) that gateway involvement is hardwired and therefore always imposed.

In embodiments, preparation for barriers performed by the gateway may include the preparation of data to be fetched by the accelerator 51, such as experience data sets required by the accelerator 51 for the next stage in learning a model. Preparation in this context may include fetching the data from storage disks or other media, formatting data in a form which is required by the training algorithm running on the accelerator 51 or decompression of image data. Additionally, preparation for barriers may include consuming output data produced by the accelerator 51. As discussed later, some or all of this preparation may be conducted at the gateway 52. As a minimum, the gateway 52 is in the pathway between the storage disks or other media and the accelerator 51.

The sync request 56 to the LSBM 118 could be delivered from a processing element as a network (or PCIe) packet, and/or the sync acknowledgment 57 could be returned as a network (or PCIe) packet. In general the (or a) host 63 may be involved in any one or more of the hierarchical levels of sync.

Generally, the concept of ESP credits can be applicable to any multi-tile architecture, not just the example architecture disclosed herein. Nor is it necessarily limited to the BSP application context. The disclosed technique has a particular synergy with systems which employ a single rendez-vous point such as BSP, or when the number of distinct rendezvous points between a host or other outside-world system and the machine in question is limited to just one rendezvous or a very small number (as opposed to, say, CSP). Nonetheless the applicability of the present disclosure is not absolutely limited in this respect. In any system or application, a latency saving can be achieved by enabling the tiles to pass through a specified number of synchronization barriers without involving the host 63, thus reducing the number of times the multi-tile sub-system has to interact with the host 63 and therefore reducing the number of times the latency penalty of doing so is incurred.

Furthermore, although embodiments have been exemplified in terms of a PCIe interface between cards or with the host 63, this is not limiting and other types of interface could be used, e.g. Ethernet.

Furthermore, the implementation is not limited to synchronising communications between a host system 63 and an accelerator 51 which would otherwise run asynchronously. In embodiments, the gateway 52 could be employed for the synchronization between two independent BSP or other parallel processing subsystems, which run synchronously internally, but run asynchronously, with respect to one another. The gateway 52 allows the size of a sync group to be increased to a much larger size and enables a more efficient tree structure for those larger groups.

The batches of data received at the gateway 52 are stored in a memory 114. The memory 114 is a local memory (e.g. DRAM) that is reserved for use by the gateway 52. In response to the sync request 56, the data may be retrieved from the memory 114 by the gateway 52 and transferred to the accelerator 51. The path 116 illustrates the flow of each batch of data. Note that each batch of data is held in the memory 114 for a period of time which may vary from batch to batch. It depends on the time the batch enters the gateway 52 and the time it is pushed to the accelerator 51, and these are not necessarily related.

The LSPM 117 is configured to indicate to the gateway 52, the timing of the transfer of data to the accelerator 51 from the memory 114. This allows the LSPM 117 to dictate the appropriate timing for the deployment of data from the memory 114 to the accelerator 51 so as to prevent overflowing of the gateway memory 114.

Furthermore, the flow of data into the gateway memory 114 from the host/remote storage is managed so as to avoid overflowing the gateway memory 114.

In FIG. 7, data for processing by the accelerator 51 is transferred from the host 63 to the gateway 52, which stores it in local memory 114. The data may be pulled by the gateway 52 via RDMA read or may be written via an RDMA write made by the host 63 to the gateway 52.

Figure 11:
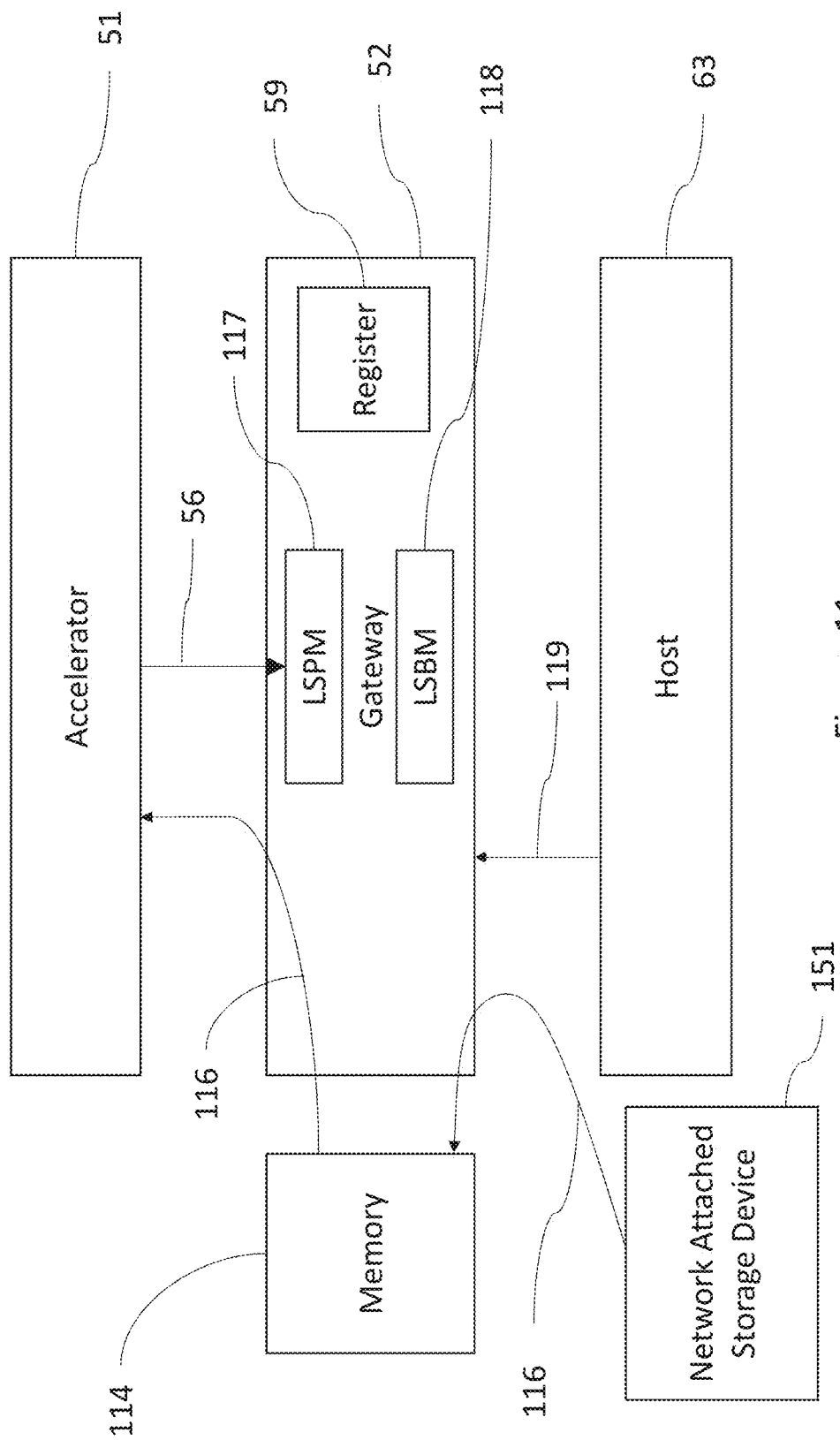
FIG. 11 is a schematic illustration of a system including an accelerator, gateway, and host.

Reference is made to FIG. 11, which shows an alternative scheme in which data 116 is retrieved by the gateway 52 from a network attached storage 151. The network attached storage 151 is also be referred to herein as remote storage. In FIG. 11, like elements to elements of FIG. 11 are indicated with like reference numerals.

In FIG. 11, the host 63 sends a descriptor 119 to the gateway 52. The descriptor 118 identifies the location of a network attached storage 151 that is accessible to the gateway 52. The gateway 52, when executing a data fetching instruction referring to the descriptor 119, retrieves the data 116 from the network attached storage 151. The gateway 52 then stores the data 116 in memory 114 prior to transferring the data to the accelerator 51.

In some embodiments, instead of transferring the descriptor 119 from the host 63 to the gateway 52, the pre-compiled code stored by the gateway 52 includes the descriptor. In this case, the gateway 52 autonomously retrieves data from the remote attached storage 151 without the intervention of the host. In some examples of the application, the gateway 52 comprises a System on Chip (SoC) serving as a standalone appliance so that no external host 63 required. The entire application stack runs directly on the SoC or on one of the SoCs in the broader system. The gateway 52 is configurable to operate in a first mode where it interacts with an external host 63 processor and a second mode where no such external host 63 is required. The remaining parts of the gateway 52 (e.g. the streaming engine, described with respect to FIG. 8) perform the same functions irrespective of which of these modes the gateway 52 is configured to operate in.

Figure 8:
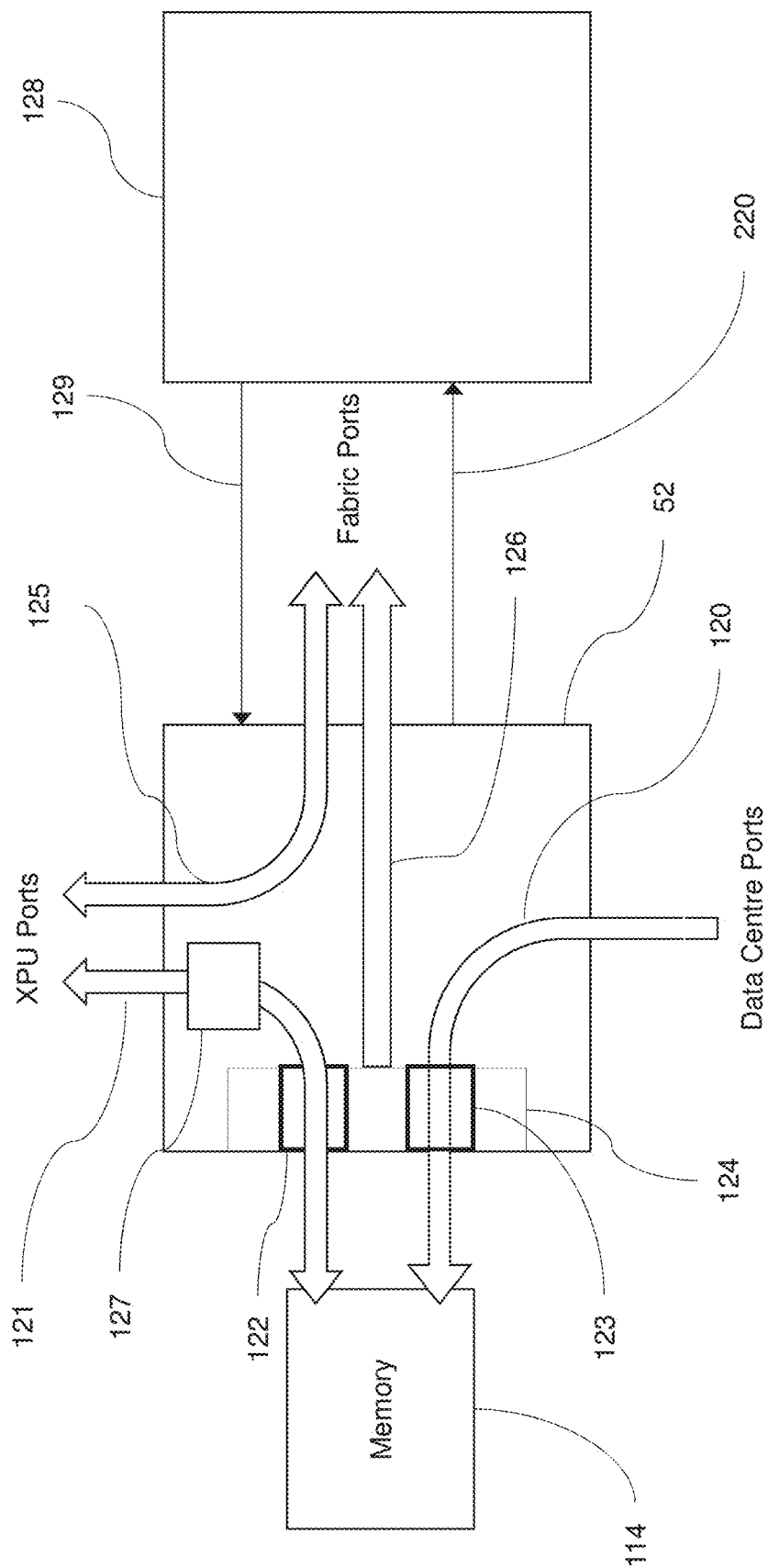

Reference is made to FIG. 8, which illustrates the gateway 52 in more detail. FIG. 8 shows the various paths that data takes through the gateway 52.

FIG. 8 shows how data 120, which is for processing by the accelerator 51, is transferred to the memory 114 from the host 63 or remote storage 151. As already mentioned, in some examples, the data 120 is transferred to the gateway 52 from the host 63. In other examples, the data 120 is received from a remote storage 151 (i.e. network attached storage) in response to a read request from the remote storage 151 made by the gateway 52. The gateway 52 retrieves the data 120 from the remote storage 151 via RDMA. The data 120 is received via the data centre ports. Additionally, as well as retrieving data, the gateway 52 writes data (not shown) to the host 63/remote storage 151. The data writes are made via the data centre ports. During the exchange phase, data may be transferred from gateway memory 114 to the accelerator 51.

Instead of, or in addition to, the transfer of data to the accelerator 51 from gateway memory 114 during the exchange phase, data may be transferred from the accelerator 51 to the gateway 52. The accelerator 51 is configured to send the data in the form of data packets to the gateway 52, wherein each data packet includes a header indicating an address. The gateway 52 uses the address of the data packets to determine where to send them. For example, the data packets may be stored in memory 114. The data packets may be sent to a further gateway 128. The data packets may be dispatched to an accelerator connected to the further gateway 128. The data packets may be sent to host 63/remote storage 151.

The data 120 traverses the gateway 52 to the memory 114 under the control of a streaming engine 124 (which is also responsible for retrieval of data 121 from memory 114 for delivery to the accelerator 51). The streaming engine 124 performs execution of the data streaming operations. These operations for a batch of data may be specified by a work descriptor (WD). The streaming engine 124 comprises two execution engines and code memory (not shown). One of the execution engines is a Data Mover Engine (DME) 122, the other is a Pre/Post Work engine (PPE) 123. They execute instructions loaded into the code memory as an executable image, which is produced by a compiler. The streaming engine 124 has a set of work instructions for execution by the DME 122 and a set of work instructions for execution by the PPE 123. The sets of instructions for the DME and PPE are coordinated by the WD, as set up at compile time. These instructions for a single data exchange synchronisation point may be grouped together into a single WD. The DME 124 is operated by specific DME instructions found in the DME sections of the executable image. The DME 124 uses the WD for navigating to the set of data mover (DMOV) instructions that relates to a given ESP. The PPE 123 is operated by specific PPE instructions found in the PPE sections of the executable image. The PPE 123 uses the WD for navigating to the set of pre/post-work instructions that relates to a given ESP.

The PPE's pre-work must be ready before the data exchange with the accelerator 51. The PPE's post-work in the WD can only start after the exchange has completed. The data exchange comes immediately after the sync request 56 is acknowledged and signalled both to the accelerator 51 and streaming engine 124. This request/ack signals an "Exchange Synchronization Point" (ESP).

The streaming engine 124 supports different data streaming models.

All models support a configuration where a host is allowed to tightly control the consumption of ESP credits. This supports the co-ordination of I/O operations between host 63, gateway 52, and accelerator 51, as well as a mechanism for stalling the accelerator 51 in case this is needed for other accelerator level I/O mechanisms not making use of the gateway memory 114. It may also be a mechanism used for setting break-points or single-stepping a full fabric of accelerators. When running any model under tight flow-control from a host 63, the ESP credits granted by the host 63 are transferred by the PPE scheduler to the "ESP credit register" (part of the LSBM 118). The ESP Credit Register can be read/written by gateway 52 hardware and firmware.

The first streaming model that is supported by the streaming engine 124 is referred to as "Advanced Gateway (GW) push". In Advanced GW push, the PPE 123 streams data from/to external storage and the gateway (GW) memory 114, whilst the DME 122 pushes data to the accelerator 51. Execution is based upon instructions from the compiled executable image held by the gateway. Generation of the executable image for the streaming engine 124 is integrated with the accelerator compiler. The compiler generates two related complied code sequences or executable images. A first of these is executed on the accelerator 51, whilst the second is executed on the gateway. In some embodiments, the host 63 may provide the compiled code sequences to the accelerator 51 and gateway 52.

The "gateway push model" is a usage model where the gateway 52 is the one that pushes data. This model is more sophisticated compared to the "gateway pull models" (discussed below) in that it pushes data to the accelerator 51 at agreed points in times (at agreed ESPs). This generic push model can support different types of Memory Consistency Protocols or Bridging Models for parallel programming.

Examples include Batch Synchronous Parallel (BSP), Stale Synchronous Parallel (SSP) and Async Parallel.

The Advanced gateway (GW) push model uses the credit mechanism for controlling the availability of data input (relative the accelerator) to be pushed, as well as availability of gateway 52 data buffers for the accelerator 51 to output data into. The gateway 52 executes both Data Mover Instructions (DME 122 is pushing data to the accelerator 51) AND pre/post-work engine instructions for transferring data with the external nodes (host, NAS, or other gateways). The PPE 123 is responsible for effectively stalling the DME 122 through missing ESP credits when accelerator input data is not available due to external I/O bottlenecks. A similar stall is also required when accelerator output data (headed for remote host/storage) is piling up in gateway 52 memory 114 due to external I/O bottlenecks.

This model allows the gateway 52 to deliver data with lower latency since this model allows for the pre-fetching of data from GW memory 114 into high speed gateway transfer memory 127 (e.g. SRAM) before the push to the accelerator 51 happens. Also, a push is an inherently lower latency operation than a pull because a pull requires a round trip. I.e. a pull requires a read request followed by the return of data in response to the read request. On the other hand, a push simply involves the transfer of the data.

Another advantage of the advanced gateway push model is that the accelerator 51 benefits from not spending valuable compute resources on pulling data, but instead offloads the data movement to the gateway DME 122.

The memory consistency models as described above (BSP, SSP, Async etc.) could be combined with the push model. The accelerator 51 run-time would then have to make sure that external barriers will trigger DME 122 and PPE 123 data movement. In case of a push operation, the ESP credits will be decremented by one by the gateway 52.

The second streaming model is referred to as advanced accelerator pull. In this streaming model, a PPE 123 streams data from/to external storage into gateway memory 114. The accelerator 51 then pulls data from the Gateway 52 via a PCIe read operation(s). PPE 123 execution is based upon instructions from the executable image in code memory.

In this model, the DME 122 is disabled and does not execute the operations described above. The PPE 123, on the other hand, is active and obtains the data and store it in memory 114 by issuing "pull requests" (i.e. read requests) from the external storage. The accelerator 51 will then pull data from the memory 114 at the pre-defined ESPs. The advanced accelerator pull model makes use of an executable image that contains pre/post-work instructions, without the DMOV instructions. The host 63 synchronizes the accelerator 51 via the ESP credit mechanism so that it pulls valid data prepared in gateway memory 114 at the expected ESP.

Also for this model, the PPE 123 is responsible for stalling the LSPM (via a credit mechanism) when accelerator 51 input data is not available due to external 10 bottlenecks. A similar stall may also be performed when accelerator 51 output data (headed for remote host/storage) is piling up in gateway memory 114 due to external 10 bottlenecks.

The third streaming model is referred to as simple accelerator pull. In this streaming model, the host 63 streams data in to/out of gateway memory 114. The accelerator 51 pulls data from the gateway 52 via PCIe read operation(s). The gateway 52 in this case does not execute PPE instructions but is instead a slave of a predefined I/O scheme between host 63 or NAS and the gateway 52 based on GDISM/GDESM synchronisation mechanisms. The GDISM/GDESM synchronisation mechanisms are described in more detail later.

In this model, the gateway memory 114 is serves as a memory region, wherein the host 63 has control over its contents. There are no instructions executed in the gateway 52 for loading data in memory 114. Furthermore, the DME 122 is disabled and does not execute instructions. The PPE 123 is not executing instructions, but is still functioning as a proxy to update ESP credits given by the host 63 for the accelerator 51 to discover when data is available.

The gateway memory 114 allocated for the streaming of data is maintained by host 63 as if it was PCIe attached memory, with the only difference that RDMA is used instead of PCIe.

In the above described streaming push models, the gateway 52 hides the accelerator memory access latency by using the gateway memory 114 as an on-chip streaming buffer. The overall benefits of the streaming engine 124 are that data movement can be overlapped with accelerator computation and pre-loaded into the memory 114 of the gateway 52 ahead of timed push operations. The Advanced GW push model has the additional benefit that it frees up accelerator resources otherwise used for DMA operations.

Execution of the data streaming operations in the gateway 52 is performed by the streaming engine 124 that, depending on the operational model, will run all or a subset of the gateway 52 instruction set. The instructions are loaded into gateway memory 114 as an executable image. Generation of executable images for the streaming engine 124 will be integrated with a specific accelerator/gateway compiler environment in which the compiler produces related code for running on the accelerator 51 and gateway 52.

The streaming engine 124 can be seen to comprise a set of hardware and software components that work together to ensure that the accelerators are supplied with data I/O in a performance optimal way. Depending on the operational model of the gateway 52 or streaming engine 124, the streaming engine 124 may push data in a "just in time" fashion, i.e. at planned data exchange phases representing a conditional entry-point to the next accelerator compute step, or may make data available in gateway memory 114 for the accelerator 51 to pull in the same "just in time" fashion. Preparing relevant data in gateway memory 114 prior to the data exchange phase is done via pre-scheduled data streaming instructions executed by the gateway streaming engine 124. The push model can additionally pre-fetch data from the gateway memory 114 into gateway transfer memory 127 (e.g. SRAM) for reduced latency during data exchange phases. The concept of bringing data into gateway memory 114 "just in time" is useful for cases where the gateway memory 114 is not large enough for holding all the data needed by accelerator computation algorithms.

The PPE engine uses the WD for navigating to the set of pre-work (PRE) and post-work (POW) instructions that relate to a given ESP. The terms "pre" and "post" indicate whether the operation happens before or after a WD's data exchange phase with an accelerator or other target. The PRW instruction has as its main responsibility to bring data into gateway memory 114 (e.g. from host 63, remote storage 151, or from a further gateway 128) from the host 63 or as a preparation for one or more DMOV push instructions. "Post-work" has as its main responsibility to move data out of GW memory 114 (e.g. to host 63 or remote storage 151). The PPE instructions are located in the PPE specific image section.

The DME 122 is active in the "gateway push" operational model as described above. In the push model, the DME 122 uses the WD for navigating to the set of data mover (DMOV) instructions that relate to a given ESP. The DMOV instructions push data towards the accelerator. The WD and DME related instructions are located in a DME specific image section. The DME instructions sourced from the image in physical DDR memory of the gateway 52 are converted into DMA descriptor lists that are executed by the DME's DMA machine as part of the DMOV instructions. The DME 122 will prepare DMA descriptors for several planned data exchanges that are controlled by stop criteria that allows full control of the size of each batched data exchange with the accelerator 51.

The DME 122 uses a high level programmable multi-channel DMA machine designed for streaming data in and out of accelerator memory. The DME 122 supports streaming of data to a single accelerator 51 over one or two high speed data buses using load-distribution. If the accelerator 51 is agnostic to data loading sequences, the load-distribution is achieved by local DME decisions and is not controlled by information found in the executable image.

A WD is considered "ready for execution" (or fully prepared) when all pre-work related instructions for the WD are completed as well as all the post-work instructions that have an end-criteria for this WD. Only then, will an ESP credit for the WD be added to the set of ESP credits in the LSBM 118.

A WD is considered "completed" when the "end of exchange" criteria is met. This is when all deployment operations (DMOV) are completed and all output data received from the accelerator 51 is determined to be equal to the expected output size. The expected output size is indicated in the WD.

The gateway 52 needs a way for the PPE 123 to signal to the DME 122 when a WD is fully prepared, and this is done by adding an ESP credit to the DME 122 (one could call this a WD credit or an exchange credit as well). A PPE 123 engine running several WDs ahead of the DME 122 is allowed to add several ESP credits. This prevents the accelerators from having to wait for PPE work to complete at each ESP. Optimally, at each ESP transition, ESP credits should be available already available, such that the barrier can be passed without stalling the accelerator.

One credit represents the ability of the DME 122 to transfer all data for the first data exchange with the accelerator 52. The PPE 123 increments the ESP credits by adding a new credit every time the PPE completes data pre-fetch (i.e. completes the pre-work) for the next sequential ESP. If the PPE 123 pre-loading of data from external nodes is not completed in time for the ESP, the DME 122 will find its ESP credits to be zero, and the execution stalls until the PPE 123 increments the credit count. Stalling one accelerator 51 due to missing data, will effectively stall the full set of cooperating accelerators running synchronously (i.e. sharing the same barrier sync network).

Each DMOV instruction is executed by the DME 122 in hardware as a DMA operation. These DMOV instructions are executed when the gateway push model is applied. The DMOV instructions move data residing in the referenced data buffer (in gateway memory 114) to its destination. That would normally be an accelerator 51 memory location, but other destinations are supported as well.

Since the streaming of data is batched per ESP, the DME 122 will stop transferring data when the required number of buffers from gateway memory 114 are transferred. The number of bytes exchanged per ESP batch is indicated in the WD by parameter fields for both 1) streaming engine 124 push operations and for 2) writes into gateway memory 114. It is expected that the number of bytes to push is equal to number of bytes in all buffers scheduled for the same WD. If there is a mismatch, this will lead to an exception situation.

The DME 122 is configured to use physical memory addresses for retrieving data from memory 114 without the support of a memory management unit (MMU).

For accelerators 51 with dual bus attachments to the gateway 52, there is no information in the DMOV to indicate which bus the data should be directed to. The DME 122 controls the selection of the bus, so as to balance traffic transmitted over the two busses.

The DMOV may be linked to a pre-initialized data buffer in gateway memory 114, and thus, in this case, there is no need for a related prework instruction to fill the buffer.

Alternatively, a single DMOV (with a single memory data buffer in memory 114) may be linked to a set of pre-work instructions for data gather operations. Each such referenced pre-work instruction will bring data from a specific source and location into the same data buffer at different offsets, thus forming a gather operation. The pre-work instruction is scheduled in the same WD as the DMOV it prepares data for. A single pre-work operation may provide data to be pushed by several DMOV operations.

The pre/post-work engine instruction sets are executed by the pre/post-work engine implemented in software. There is a need to perform "pre-work" relative to a given ESP and there is a need to perform "post-work" relative to a given ESP.

The PPE 123 and its instructions are available in the "gateway push" and "Advanced accelerator pull" operational models. PPE 123 uses RDMA, NFS, NVMoF, iSCSI or any other supported file access protocol for moving data to/from gateway external memory/storage 114. The execution of the streaming operation is controlled directly by the PPE instructions found in the "post/pre-work sections" of the executable image. The PPE 123 can be viewed as a software based streaming processor that takes instructions from the image file and converts these to local/remote storage operations. These transfers will be between gateway memory 114 and external memory/storage The PPE 123 executes in parallel with the DME 122, and since the DME 122 depends on the results of the PPE 123, the PPE 123 has to have its work done before the Data Mover operation performed by the DME 122 is scheduled. This is taken care of in the executable image by grouping together, using the work descriptors, DME 122 and PPE 123 instructions that belong to the same data exchange synchronisation point.

Each PRW instruction retrieves data from external storage and stores the data into a pre-compiled data buffer (in gateway memory 114) that the PRW instruction points to. PRW instructions come in different variants depending on the source of the data. These variants require different parameter sets detailing the external 10 operation. These details are looked up in referenced 10 templates set up by the control plane via the gateway control channel prior to execution start.

The compiler pre-assigns regions of memory 114 for buffers that are referenced by PRW instructions. These buffers are used for storing data retrieved from external storage when the PRW instructions are executed.

The set of ESP credits is incremented by the PPE 123 for each WD when all pre-work related instructions scheduled for this WD are completed, and only if all pre-work related instructions scheduled for all previous WDs are also completed, and only if all post-work related instructions that have an end-criteria on this WD are also completed.

The PRW instructions come in different variants depending on the source/destination of the data.

The execution order of the PRW instructions is the order in which they are expressed in the executable image. However, smaller batches of the PRW instructions will be run in parallel to optimize I/O performance from remote locations. One or more PRW instruction from one or more WDs are speculatively executed in advance of the WD when the data is needed. This is required to fill the data "pipeline" to be consumed by the WD. The gateway 52 has a parallel execution engine for pre-work, allowing it to do this pre-work filling the data "pipeline".

The completion order for PRW instructions may not be the same as the order of the instructions in the executable image. Such out of order completion is, however, not a problem since the data ends up in gateway memory 114 with no sequence requirements. When it comes to the deployment sequence of this data to the accelerator 51, the DME 122 ensures that the instruction order is that expressed by the executable image.

A PRW instruction always has an end criteria. The PRW instruction is scheduled by the GW 52 to be completed in due time before a given WD at which the supplied data is needed by the accelerator 51. The end criteria is represented by the WD in which the PRW instruction is contained. In cases where the data cannot be supplied in time for the WD, the data exchange phase will be delayed until the data is available. This effectively stalls the accelerator 51 compute phase until data is available. The occurrence of such stalls are counted, and the feedback from such monitoring will help optimize the gateway and/or the compiler.

The POW instruction does "post-work", related to a given ESP. Its main function is to move data from gateway memory 114 to an external storage (e.g. host 63 or remote storage 151). The data stored in the gateway memory 114 being data received from the accelerator 51. The POW instruction comes in different variants depending on the destination of the data. These variants would need different parameter sets detailing the external 10 operation.

It is up to the compiler to link a POW instruction to a data buffer in the memory 114 on which to operate.

For post-work, the instructions may be executed out of order since the results are not communicated to the accelerator 51, but instead are stored in host 63, remote storage 151 storage or gateway memory 114, where there is no implied semantics related to the write order for pure data.

A POW instruction always has a mandatory start criteria, which represents the earliest point in time at which the instruction may be executed. It could be executed later, but not earlier, than the mandatory start point. Thus, the POW instruction is triggered for start at a given WD. This trigger WD is represented as the WD in which the POW instruction is contained. At the completion of the previous WD, the accelerator 51 must have finished writing to the POW instruction's buffer.

There are different types of POW instruction. The first type of POW instruction involves moving data from local GW memory 114 to the remote storage 151. This can be configured by the host 63 by instructions (e.g. descriptor 119) sent via the control channel. The second type of POW instruction involves the moving of data from local gateway memory 114 to host 63. This can also be configured by the host 63 by instructions sent via the control channel. The third type of POW instruction involves the manipulation of data stored in the gateway memory 114.

A POW instruction may also have an optional end criteria represented by a parameter of the POW instruction. This may have the following uses. Firstly, this optional end criteria may enable the POW instructions to prepare data for a specific WD, much in the same way as the pre-work instruction has its end criteria implicitly given by the WD it is part of. Secondly, in cases where the gateway compiler is reusing "output" buffers used by the POW instructions for export to external nodes, it is important to protect buffers still holding unsaved data from being overwritten by the accelerator 51. In this case, the program can protect buffers by placing so—called Named Execution Barrier (NEB) instructions in the DME instruction stream as stop points until all POWs have completed flushing buffers, thus freeing buffers for reuse and more accelerator 51 output operations. These NEB instructions are described later.

If a POW instruction cannot meet its end criteria, the PPE 123 will pause the local DME 122 and consequently all accelerators to be synced up at the same sync level. The PPE 123 parses a POW instruction and finds the end criteria. There may be several POW instructions with the same stop criteria or with different or with no stop criteria.

As mentioned above, the compiler may place stop/pass "execution barriers" at given execution points in time. The (NEB) instruction refers to a named "execution barrier" completed (NEBC) object that collects the number of completion reports from objects that are instructed to signal to the NEBC when completed (e.g. POW instructions).

The NEB instruction always belong to a WD, i.e. it is enveloped by the WD. It can be inserted in all three instruction streams (DME, PPE_PRE and PPE_POST).

The "stop" state represents a stop signal to the DME/PPE not to proceed with execution of the instructions in the WD. The other possible state is "pass", which allows the DME/PPE to proceed with execution of their instructions in the WD, thus passing the NEB instruction. The state changes from "stop" to "pass" when all the instructions linked to this end criteria have reported completion by incrementing a "completions_seen" counter in the NEBC object.

The concept of an "execution barrier" is not to be confused with the ESP synchronisation primitive that may be used to control barriers in the Batch Synchronous Parallel (BSP) memory consistency model. In some examples, the NEB instruction insertion point is correlated with a specific ESP for the accelerator program, but there is no such direct requirement. The NEB can be used a generic stop point for all kinds of synchronisations.

A first example of the use of the NEB instruction may be given, where the NEB instruction(s) is inserted into the WD at the start of the DME instruction stream. The NEB represents a pre-condition for executing the DME instructions. The pre-condition is used for controlling the flushing of accelerator output buffers (or ring-buffer fill thresholds) to external nodes (e.g. host 63 or remote storage 151) via POW instructions. The set of ESP credits is not incremented until both: the NEB pre-conditions are met and the PRW instructions are completed. This means that a WD can be cached by the DME, but not executed further if there are no ESP credits available. When the PPE 122 has completed execution of the PRW instructions, it will first check if all NEB instructions in the WD are in "pass" state. If they are, and all other preconditions for giving a credit is met, the credit will be incremented. The DME execution engine will raise an exception if it sees that the NEB instruction is in stop state. This exception indicates that the PPE has wrongly added a credit despite a "stop" state, or that there is some raise condition in the DME/PPE implementation.

A second example of the use of the NEB instruction may be given, where the NEB instruction is inserted into the post-work instruction stream for flow-controlling data export from the gateway 52 to the host 63. In this case, the host 63 controls the state of the NEBC. In this model, the host controls whether or not the PPE 123 is allowed to execute POW instructions to transfer data to the host 63, thus passing a NEB instruction. This is controlled by the host providing updates to the "linked" NEBC object's state, to set the state to a "pass" state. The host is only allowed to set the "pass" state when all the linked POW instructions are completed.

An end criteria is always placed on the "next occurrence" of a NEB in the instruction stream. The "next occurrence" is to be understood as relative to the execution of the POW. A third example of the use of the NEB instruction may be given, where the NEB instruction is inserted into the pre-work instruction stream for flow-controlling data import feeding from the host 63. In this case, the host 63 is controlling the state of the NEBC. In this model, the host controls whether or not the PPE 123 is allowed to execute PRW instructions to transfer data to the memory 114 from the host 63 or remote storage 151, thus passing a NEB instruction. This is controlled by the host 63 providing updates to the "linked" NEBC object's state, to set the state to a "pass" state.

The NEBC object is always initialized in a stop state at the start of program execution. The same reinitialization is performed when starting on the next instruction after the NEB. When setting the state to "stop", the "completions_seen" is set to zero as well.

In the DME case, the DME 122 itself may not have come so far in its execution that the NEB is seen yet, and if all linked instructions are completed by the time the NEB instruction is seen, the "completions_seen" is identical to "expected_completions" and the state will be observed as "pass", and thus execution continues with no waiting. Otherwise, the DME 122 waits until all linked instructions are completed.

There is one streaming engine 124 per accelerator 51 in a gateway 52, where each streaming engine 124 may run in the various modes that has been described.

There are several streaming engine instances made available across the fabric. There is one streaming engine 124 per accelerator 51, where each streaming engine 124 is executing an image. Each streaming engine 124 feeds data to an accelerator 51 via one or more high speed buses (e.g. PCIe Gen4).

There are a plurality of different possible streaming flows that may be implemented using the streaming engine 124. For example, in a first possible streaming flow, the gateway 52 may enable the streaming of data to the accelerator 51. This streaming of data may be initiated by a further accelerator which is configured to provide the data. Alternatively, the streaming of data may be initiated by a DME 122 of the gateway 52, which executes instructions to transfer data from memory 114 to the accelerator 51. Such data may have been received at the gateway 52 from the host 63 or remote storage 151.

In a second possible streaming flow, the gateway 52 may enable the streaming of data to a remote accelerator. The accelerator 51 may provide packets to the gateway 52 having an address identifying the remote accelerator in a global address space. The gateway 52 is configured to use this address to forward the data packet to a further gateway 128 for deliver to the remote accelerator.

In a third possible streaming flow, the gateway 52 may enable the streaming of data into the local gateway memory 114. This may be the result of a local gateway offload. The transfer of data to the memory 114 may be from the accelerator 51 at an ESP. The transfer of data to the memory 114 may be the result of a local RDMA or host RDMA. The data may be transferred to the memory 114 from external storage, such as the host 63, the NAS 151 or from the further gateway 128. The transfer of data into memory 114 from such external storage is part of the pre-work carried out by the PPE 123.

In a fourth possible streaming flow, the gateway 52 may enable the streaming of data into the memory of a further gateway 128. The data transfer may be initiated by the gateway 52 itself. The data transfer may be initiated by the accelerator 51, which provides packets to the gateway 52 having an address identifying the further gateway 128 in the global address space. The transfer of data to further gateway 128 may be the result of pre-work instructions executed by the further gateway 128 to pull the data from the gateway memory 114.

In a fifth possible streaming flow, the gateway 52 may enable the streaming of data to the remote storage 151. The data is transferred from gateway memory 114 to the remote storage 151 by one or more of: RDMA, the Network File System (NFS) protocol, Non-Volatile Memory over Fabrics (NVMoF), and the internet Small Computer System Interface (iSCSI) protocol. The data transfer is initiated by the gateway. This transfer to the remote storage 151 may result from the execution of post-work instructions by the PPE 123.

In a sixth possible streaming flow, the gateway 52 may enable the streaming of data to the host 63. The data is transferred from the gateway memory 114 to either pinned host memory or RDMA accessible host memory. This transfer to the host 63 may result from the execution of post-work instructions by the PPE 123.

In a seventh possible streaming flow, the gateway 52 may enable the streaming of data from one or more remote NFS servers. The data transfer from these servers may occur in response to a request transmitted by the gateway 52.

As mentioned earlier, parallel programming models for AI and HPC usually follows a 3-phase iterative execution model: Compute, Barrier, and Exchange (Data transfer, Collective and Broadcast). The implications are that accelerators usually requires data transfer to/from accelerator at pre-compiled data exchange synchronization points and/or collectives executed upon accelerator request. The request represents a sync point where the accelerator 51 has finished processing the available data, and now requires to export some data and requires to import some data. The gateway 52 will schedule its data movements immediately after an accelerator exchange request that is acknowledged.

The gateway streaming engine 124 optimizes data movement, thus the data buffer "object" play an important role in holding the data. By passing pointers to buffers (in the gateway memory 114) during execution, the system implements zero copy semantics during operation. The data buffers are either pre-initialized in the loaded image, or are filled by the PPE 123. In both cases a reference to the buffer in memory 114 may be used by the DME 122 for transferring data to the accelerator 51 at the ESP.

There may be cases where there is no pre-work required for preparing accelerator data, such as when data is already prepared and embedded in the loaded executable image. In such cases, the PPE 123 will also be responsible for posting ESP credits to the DME 122.

There may also be ESPs where there are no data movement towards the accelerator 51 (e.g. only accelerator output data), and in such cases the PPE 123 will also be responsible for posting ESP credits to the DME 122. In this case, the PPE 123 will, in response to determining that there is no data movement towards the accelerator 51 during an upcoming ESP, increment the ESP credits for the upcoming ESP.

It is always the PPE 123 that adds ESP credits.

For the pre-work instructions only: If a WD's pre-work is completed ahead of time compared to work in earlier issued WDs, the design will need to queue the pre-work completion info and increase the number of ESP credits after the handling of all the previous WDs when they have completed.

For accelerator data import (i.e. data transfer from gateway 52 to accelerator 51), the WD describes how many bytes that are to be transferred in both directions (i.e. between accelerator 51 and gateway 52) during an exchange. The accelerator 51 in the push model has compiled in the same information and thus knows when all expected data is received for this exchange, and starts the compute phase immediately after all data is received. In the pull model, the accelerator 51 controls when the exchange is over by stopping the reading of the data from the gateway 52.

For accelerator data export: The accelerator 51 knows from its compiled code how much data to send to gateway 52 for a given ESP, and the gateway 52 knows how many to expect by reading this information from the WD.

When the gateway 52 has received the exact number of bytes expected from the accelerator 51, it will move on to execute the next WD. In executing the next WD, the gateway 52 may perform post-work comprising local operation on data in the gateway memory 114. Additionally or alternatively, the gateway 52 may perform post-work to transfer the data to its final destination. Alternatively, the gateway 52 may perform no post-work. For example, it may let the data stay in gateway memory 114, allowing the memory 114 to function as an off-accelerator data cache for later read back. In executing the next WD, the gateway 52 may perform pre-work needed to be completed prior to the next ESP. Additionally or alternatively, the gateway 52 may perform DMOV instructions to be executed after the next ESP. If there are ESP credits available, the DMOV instructions are used for pre-loading data to the gateway transfer memory 127 in advance of the ESP. If there are no ESP credits, the DME 122 awaits ESP credits, and when ESP credits are available performs pre-loading.

If the PPE instructions—i.e. both post-work (POW) and pre-work (PRW) instructions—are targeting remote storage 114 for static data that is known to be already available on a storage node, then there is no need for data synchronization with that node as long as the gateway supports the storage protocol for direct access to the data.

The host 63 memory is small relative to the amount of data which it is transferring to the gateway 52 and accelerator 51, so the host 63 needs to bring the data into its memory "piece by piece". Due to this "piece by piece" nature, there needs to be a synchronization mechanism between the gateway 52 and host 63 controlling when data is available for gateway 52 initiated RDMA reads (gateway data import). Likewise, for the gateway 52 initiated RDMA writes (i.e. gateway data export), a similar synchronization is needed. The challenge for the total AI appliance is to have data streaming continuously in and out of the gateway/ accelerator, so such a synchronization mechanism is vital to AI performance. The system needs a well-designed solution with minimal overhead for this to scale to large AI fabrics.

The streaming engine 123 has several modes of operation for moving data between gateway and host.

In a first mode of operation, the streaming engine 124 runs as a slave of the host 63 under commands from the host 63. In a second mode of operation, the streaming engine 124 executes based on pre-compiled instructions stored in its code memory. In the third mode of operation, the accelerator 51 generates a sequence of PPE 123 and DME 122 operations to the gateway 52.

In the first mode of operation, the streaming engine 124 acts as a slave of the host 63 and performs the operations of storing data in memory 114, and retrieving said data from memory 114 for delivery to the accelerator 51, under the control of the host 63.

In the second mode of operation, the streaming engine 124 prefetches data from the host 63 or remote storage 151 in dependence upon a pre-complied executable file derived from the compiler that is used to generate the code of a complete system composed of accelerators and gateways. Since the compiler is used to generate code for the gateway 52, which fetches the data to be delivered to the accelerator 51, and the accelerator 51, which processes the data, the host 63, the gateway 52 and the accelerator 51 are able to act in sync with one another. The Gateway 52 file anticipates the data needed by the accelerator 51, prepares that data for deployment in advance of the associated compute phase by storing it in memory 114. The gateway 52 prepares the data for transfer to the accelerator 51 at the appropriate time in dependence upon the code generated by the compiler. The DME 122 transfers it to the accelerator 51 in a latency optimized manner at precisely the right time for the accelerator 51, in response to a sync request 56 from the accelerator 51. The DME 122 sits close to the accelerator 51 for latency optimised delivery.

In a third mode of operation, the accelerator 51 informs the gateway 52 in advance of the next n barriers what data to prepare for transfer to the accelerator 51 from memory 114 for the corresponding n barriers. In this mode of operation, the accelerator compiler can foresee future I/O operations and thus schedule such commands to the gateway 52 so that the gateway 52 has adequate time for delivery of the data.

A compiler produces a set of computer code instructions that are executed by the accelerator 51. These sets of computer code instructions may be referred to as executable images. In some embodiments (e.g. in the second mode of operation described above), the compiler may also produce a related set of streaming engine data movement/processing commands that are fulfilled by the gateway 52.

The compiler produces one executable image per streaming engine. The executable image references a flat contiguous XPU Virtual Address (XVA) space as seen from an accelerator.

This XVA space covers internal accelerator memory as well as "Streaming Engine sandbox" memory mapped via memory management unit (MMU) mappings into the same XVA space. The execution image also references a "host sandbox" virtual address (HSVA) space that covers the required host memory accessible to the streaming engine 122. This "host sandbox" consists of "tagged" (i.e. named) host buffers allowing the GW execution image to access the host virtual address space "by name" rather than "by address". This HSVA space is relevant in the GW operational model: "GW push model" and the "Advanced XPU pull model".

Within these two virtual address spaces (XVA and HSVA), the compiler is responsible for defining the existence of buffer resources and addressable elements needed by the streaming engine 122, accelerator 51 and host 63. This can be expressed as virtual addresses and/or tagged (named) buffers.

The compiler is also responsible for defining reuse of gateway buffers in memory 114 between iterations and sequences of WDs as it sees fit and when needed due to limited gateway memory 114. Buffer reuse optimizations are not required as long as there is enough memory assigned to the gateway 52.

Lastly, the compiler is responsible for setting up the translation of the XVA space into the streaming engine sandbox for direct access to data buffers in memory 114. This is done by generating data move instructions for initialising MMU Page Table Translation (PTT) entries using relative offsets within a streaming engine sandbox as initial values. The gateway loader will ensure final relocation to physical addresses.

For a gateway 52 configured to communicate with two or more accelerators, it is currently not possible for one accelerator to access the streaming engine sandbox assigned to other accelerators. This is enforced by MMU setup inside each accelerator or accelerator support chip. The XVA space of the different accelerators doesn't overlap. Streaming engines run in their separate "XPU sandboxes" and all access is compile time restricted (and load time reviewed) to stay within its own sandbox. Due to the accelerator's onboard MMU, it may be possible to construct a common memory region that is shared between these two. That would require special features to be added to the image format.

The compiler must generate instructions for a host 63 to orchestrate several totally independent 10 channels between the host 63 and the streaming engines 124 executing in parallel (on same or different gateways) for the same tenant application.

To ensure that host memory accesses from the gateway 52 don't have direct dependencies on the host virtual/physical addresses, the association of gateway 52 accesses to host buffer memory is done via compile time assigned "tags" (i.e. names) representing host memory addresses. Modern RDMA enabled adapters perform this "tag" to address mapping in hardware. The tag approach should be introduced for all buffers for ease of buffer identification, not only the ones that are used in host data exchanges. The compiler tool chain gets help from this "tag" approach as now all buffers gets unique names, and the resulting image can be optimized in a second "optimization stage" by analysing all buffers identified via unique "tags", sizes and the buffers free/occupied time slots, thus enabling host buffer reuse optimization algorithms.

Since tag matching hardware may have limitations on how many tags it may handle, the "tag" name space will be divided into two. One lower part that is compatible with the hardware in question and is used for naming active addressable host buffers, and another higher range that only is used for unique identification of other active buffer allocations (host or local gateway buffer accesses etc.). Compiling the gateway image to be using uniform block sizes (e.g. n*4K blocks) may help to reduce memory fragmentation and thus optimize buffer reuse for later data movement operations. The instructions dealing with buffers will encode the size of the memory block allocation (a block can contain several data buffers) in order to help facilitate buffer/block memory reuse. The same approach should be adapted for host buffers as well so that host memory and tags can be reused over time as well.

Referring again to the transfer of data to the accelerator illustrated in FIG. 7, in some examples, the gateway 52 receives the data from the host 63 or remote storage 151 and stores it in memory 114 before making it available in a fast gateway transfer memory 127 for transfer to the accelerator 51. The DME 122 pre-loads the fast gateway transfer memory 127 from memory 114 in dependence upon the DME instructions. The contents of the gateway transfer memory 127 are transferred to the accelerator 51 in response to the receipt from the accelerator 51 of a synchronisation request 56. This pre-loading into the gateway transfer memory 127 is used in the push model described above. In some examples, the pre-loading of the gateway transfer memory 127 is carried out only if the number of ESP credits is greater than zero.

Figure 14:
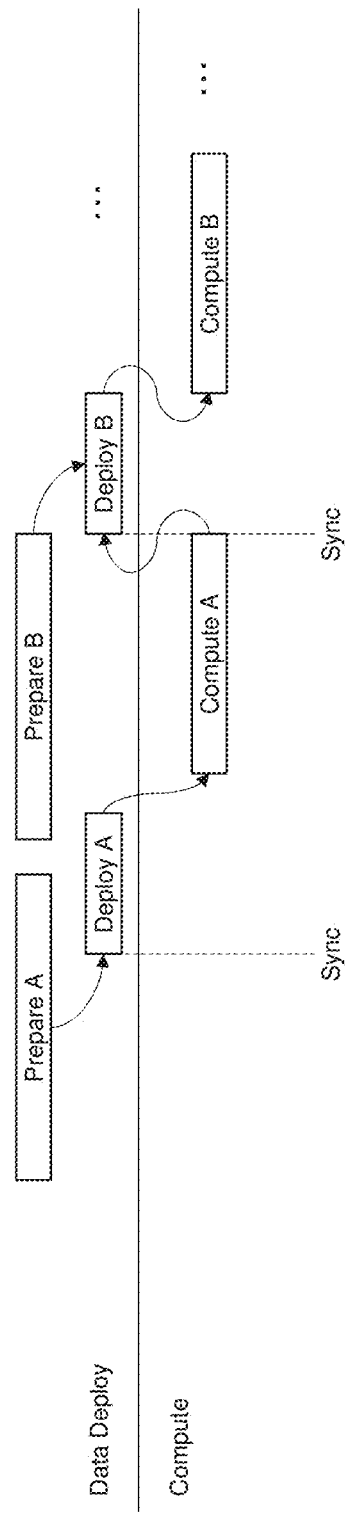
FIG. 14 illustrates an example method of deploying and computing data.

Reference is made to FIG. 14, which illustrates how the preparation of data, its exchange between the gateway 52 and accelerator 51 and the processing of this data are related. The prepare and deploy stages are performed by the gateway 52, whereas the compute stages are performed by the accelerator 51. Data is prepared by the gateway 52 in advance of the associated compute phase. The data is stored as closely as possible to the accelerator 51.

When the accelerator 51 is able to accept the data and indicates as such by sending a sync request 56 to the gateway 52, the gateway 52 deploys the data using the full capacity of the port/s linked to the accelerator 51 with no external dependencies. As the deployed data is being processed by the accelerator 51, the gateway 52 prepares the next phase of data to be deployed. The engine scales its operation across all available gateway data centre ports.

The gateway 52 is able to receive data from the host 63 or remote storage 151 and perform storage and augmentation of data that is needed by additional gateways. This data may be transferred to the additional gateways. The data transferred to the additional gateways may then be provided to accelerators associated with those additional gateways. This may be useful for avoiding bottlenecks. For example, instead of each gateway independently retrieving data from a remote storage 151, and hence causing a bottleneck at the access to the remote storage 151, one gateway 52 may retrieve data from the remote storage 151 and provide said data to a plurality of gateways. This may address the problem of a bottleneck when accessing the remote storage 151.

When the gateway 52 receives the data from the host 63 or remote storage 151, prior to providing this data to the accelerator 51, the gateway 52 processes the data. This processing may be carried out by the streaming engine 124. The processing may comprise one or more of: data augmentation (noise injection), decompression, decoding (e.g. of image and video data, such as JPEG format images and H264 format video). This processing is not carried out in the simple accelerator pull model discussed above.

To keep memory usage minimal, data is compressed when it is loaded into the gateway 52 and decompressed at the latest possible time before delivery to the accelerator 51. The gateway 52 may provide a latency optimized hardware decompression engine (not shown) for certain types of compression. Additionally, decompression can be implemented in gateway software to provide extended support for any arbitrary compression algorithm.

By performing data augmentation (e.g. noise injection) in the gateway 52, the original data can be stored once, in its original format, and fetched once. That data can then be replicated to multiple accelerators with different augmentation settings applied, by the gateway 52, to each replicated copy. The gateway 52 provides a set of augmentation methods in hardware and provides the ability for gateway software to implement different algorithms for said augmentation.

In one embodiment, the streaming engine 124 provides two data acceleration features. The streaming function provides a replicate feature and a replicate and transpose feature. This allows training data to be replicated from one gateway to many other gateway, thus reducing the 10 connectivity need.

The data is received at the gateway 52 from the host 63 or remote storage 151 and is stored (after traversing path 120) in the memory 114 by the PPE 123. The DME 122 retrieves the data to be sent along path 121 from the memory 114 and causes the data to be sent to the accelerator 51. The data is sent to the accelerator 51 from the memory 114 via the indicated accelerator ports. Data transfer along the path 121 is triggered by the sync signals as described already.

The gateway 52 allows the provision of data to the accelerator 51 (which involves transfer of the data over the path 121) to be decoupled from the retrieval of the data from the host 63 or remote storage 151. In other words, the gateway 52 enables the transfer of data from the host 63 or remote storage 151 to proceed ahead of the computation performed by the accelerator 51.

FIG. 8 illustrates two further data paths that allow exchange of data between the gateway 52 and further gateways. The gateway 52 includes a path 125 from which data may be transferred between the accelerator 51 (coupled to the gateway 52 by the accelerator ports shown) and a further accelerator (not shown) via a further gateway 128 (coupled to the gateway 52 by the fabric ports shown). The gateway 52 and the further gateway 128 act as switches on this path 125 and enable an extended data exchange fabric between accelerators. The further gateway 128 may be configured to transfer data to/from a further host to which it is connected. The data transfer along this path 125 may be unicast (i.e. data directed to a single accelerator), broadcast (data transmitted without being directed to specified accelerators) and multicast (data directed to multiple specified accelerators). In broadcast mode, packets sent on the fabric port contain a Multicast Group ID. Each gateway has a table which contains a list of destinations for each multicast group ID. When the gateway receives such a packet, it looks up in the table, the list of destinations corresponding to the multicast group ID included in the packet and transmits the packet to those destinations.

In one embodiment the XPU Ports are a custom Root Complex implementation providing specialized data movement capabilities. In addition to transferring packets to/from the gateway memory 114, the XPU Ports also provide a peer-to-peer capability to/from the Fabric Ports. Packets which are targeting memory space mapping to a remote accelerator are detected at the XPU Port and directed towards the appropriate fabric port. The receiving Fabric Port will direct the packet to the correct destination accelerator port. Also, gateways can forward packets from one fabric port to another fabric port. This allows arbitrarily large fabrics to be traversed. In this way, full accelerator to accelerator exchange is enabled through the gateway fabric.

FIG. 8 also illustrates a data path 126 for exchanging data between the gateway 52 and a further gateway. The data path 126 is used for the exchange of synchronisation and management messages between the gateway 52 and the further gateway 128. Additionally, the data path 126 is used to exchange data between the memory 114 associated with gateway 52 and a memory associated with the further gateway 128. The data exchanged via data path 126 is exchanged as part of the pre-work, when pre-work instructions are executed by the PPE 123.

Data may be transferred from the memory of the further gateway 128 to the memory 114 in response to the execution of pre-work instructions by the PPE 123. This data is then available in memory 114 for transfer (e.g. by a PCIe read operation from the accelerator or by the execution of a DMOV instruction by the DME 122) to the accelerator 52 at the upcoming ESP. When the PPE 123 completes execution of the pre-work instructions for transferring data into its memory 114, it increments its set of ESP credits.

As noted earlier, a sync zone/group may include a plurality of gateway. In such a case, instead of, or as well as, a sync request being received from the associated accelerator 51, a sync request may be received at the gateway 52 from a further gateway 128. In this case, this other gateway 128 may be referred to as a "downstream gateway".

Figure 15:
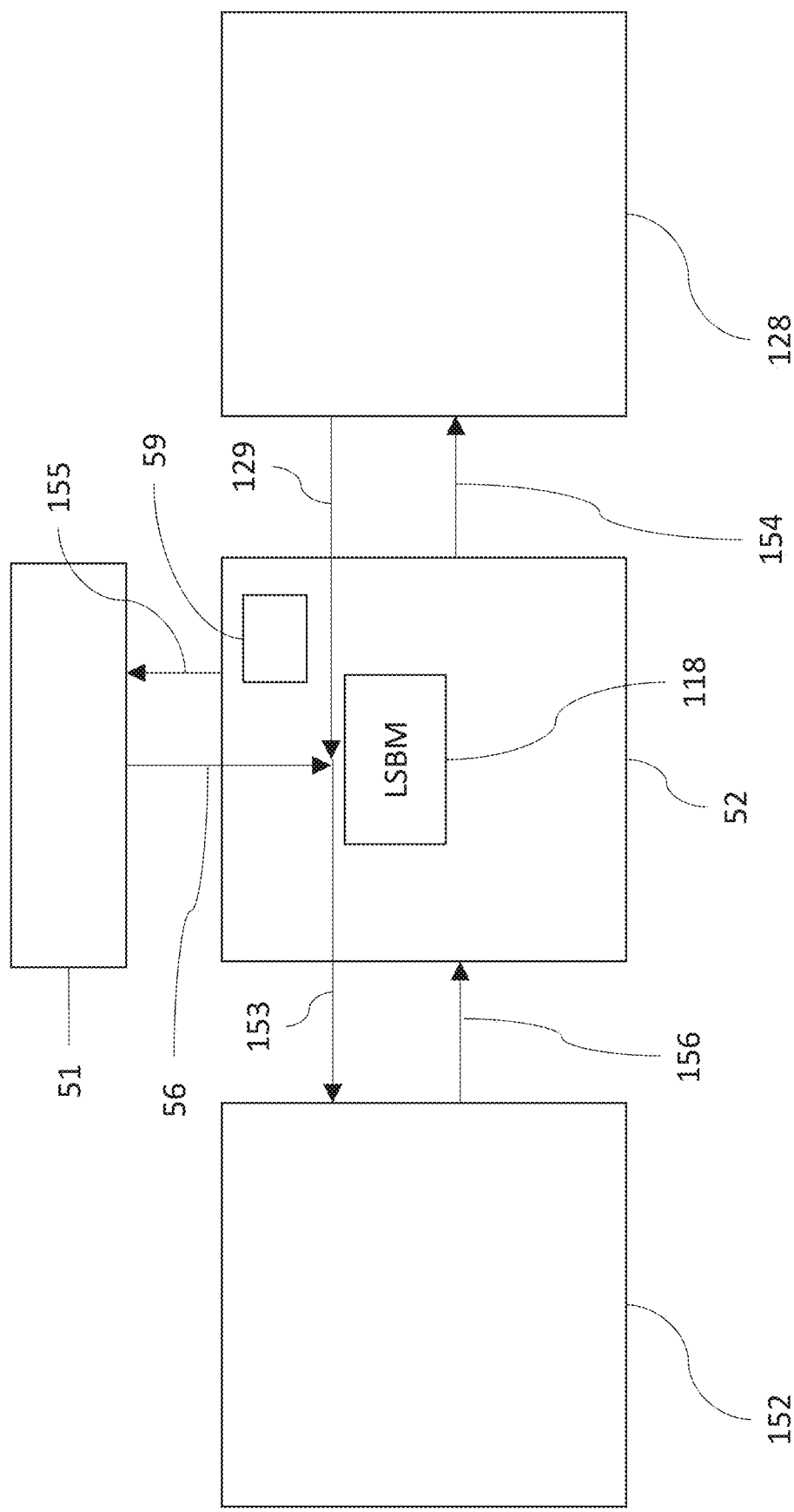
FIG. 15 is a schematic illustration of the exchange of sync requests and acknowledgments between three gateways.

Reference is now made to FIG. 15, which shows the gateway 52 in communication with the further gateway 128 and, additionally, a third gateway 152. When the sync request 129 is received from the further gateway 128, the gateway 52 may allow the synchronisation barrier to be passed by transmitting a sync request 153 upstream to another gateway (not shown) in the case that the gateway 52 is not a synch master (i.e. the gateway 52 is a synch slave). The sync request 129 may first be aggregated with one or more sync requests (e.g. sync request 56) received from the local accelerators (e.g. accelerator 51). In this case, it is this aggregated sync request 153 that is transmitted upstream to the gateway.

Alternatively, when the sync request 129 is received from the other gateway 128, the gateway 52 may allow the synchronisation barrier to be passed by sending a sync acknowledgment 154 to the further gateway 128 in the case that the gateway 52 is a master gateway. In the case that the gateway 128 is the master gateway, any sync requests received from the local accelerators (e.g. accelerator 51) are also acknowledged (e.g. by transmitting acknowledgement 155).

The ESP credits in the LSBM 118 held by the gateway 52 may be used to control the synchronisation request forwarding between the gateway 52 and the further gateway 128. As with the barrier between the accelerator 51 and the gateway 52, the ESP credits are only used to control the synchronisation request forwarding between the gateway 52 and the further gateway 128 in the case that gateway involvement is indicated by a local accelerator (e.g. accelerator 51) that sends a sync request 155 to the gateway 52. This indication may be stored in register 59 as described earlier. If no gateway involvement is indicated, when the sync request 129 is received, the sync request 153 is sent upstream and when a sync acknowledgment 154 is returned, the synchronisation barrier is passed.

Assuming gateway involvement by the accelerator 51 is indicated, if the number of the ESP credits associated with the accelerator 51 is non-zero, and the gateway 52 has received sync request 129 from a downstream gateway 128, if the gateway 52 is not the sync master gateway (i.e. is a sync slave gateway), the barrier is passed upstream. The sync request 129 is aggregated with a sync request 56 from the accelerator 51 to form sync request 153 which is transmitted to an upstream gateway 152. The ESP credits in each LSBM 118 in the sync chain is decremented upon receiving a sync ack 156 r corresponding to the sync request 153 for a synchronisation requiring gateway involvement.

Assuming gateway involvement by the accelerator 51 is indicated, if the number of the ESP credits associated with the accelerator 51 is non-zero, and the gateway 52 has received sync request 129 from a downstream gateway, if the gateway 52 is the sync master gateway it will send a sync acknowledgment 154 to the downstream gateway 128 and to its own streaming engine(s) 124. Upon reception of the sync acknowledgment, the streaming engine 124 decrements the number of ESP Credits held by the LSBM 118.

Thus, the LSPM 117 of the gateway 52 can prevent propagation of sync requests to other gateways (i.e. LSPMs) in the absence of ESP credits in the LSBM 118. This ensures that when an acknowledgement is finally generated by the sync master, all accelerators will start to execute their superstep at the same time.

The gateway 52 includes a plurality of interfaces, e.g. an interface to the accelerator 51, an interface to the further gateway 128, an interface to the third gateway 152. The gateway 52 includes a register indicating the directionality of each of these interfaces for sync purposes, i.e. whether the entity such as the further gateway 128 is upstream or downstream of the gateway 52. Hence, the register indicates to which interfaces, sync requests are to be sent over by the gateway 52 in response to the gateway 52 receiving a sync request from a downstream entity. In the case that the register indicates that none of the interfaces are for transmission of the sync request, this indicates that the gateway 52 is the sync master. In this case, the gateway 52 transmits sync acknowledgments over all of the interfaces over which it has received sync requests.

In the case that the gateway 52 functions as slave gateway, it may receive one or more sync requests from the accelerators (e.g. accelerator 51) that are associated with it. These sync requests are aggregated by the gateway 52 which then passes them upstream to the further gateway 128 (assuming there are ESP credits available for each local accelerator indicating gateway involvement from it receives sync requests). Assuming the further gateway 128 is also a slave, that further gateway gathers that request, and all sync requests from its own local accelerators and then forwards a new aggregated sync request to the next gateway (assuming there are ESP credits available for each local accelerator indicating gateway involvement from it receives sync requests). This happens in parallel across the sync network. Eventually the master gateway receives sync requests from all downstream gateways and its own associated accelerators. Then, and only then, is the sync completed and the sync acknowledgments generated by the master gateway (assuming there are ESP credits available for each local accelerator indicating gateway involvement from it receives sync requests) and sent downstream to the entities (i.e. local accelerators or downstream gateways) from which it received sync requests. Each gateway downstream which receives a sync ack will transmit a sync ack to the entities from which it received sync requests.

As noted, sync requests may be received at gateway 52 from a plurality of local accelerators (not just the example accelerator 51). Each accelerator is associated with a different set of ESP credits. Only if all the ESP credits for each accelerator from which a sync request (and which indicates gateway involvement) has been received is non-zero will the gateway 52 pass the aggregated sync request upstream (in the case that it is a slave) or acknowledge the sync request (in the case that it is the master).

As previously, following transmission of a sync acknowledgment to the accelerator 51, the gateway 52 is configured to exchange data with the accelerator 51.

Figure 10:
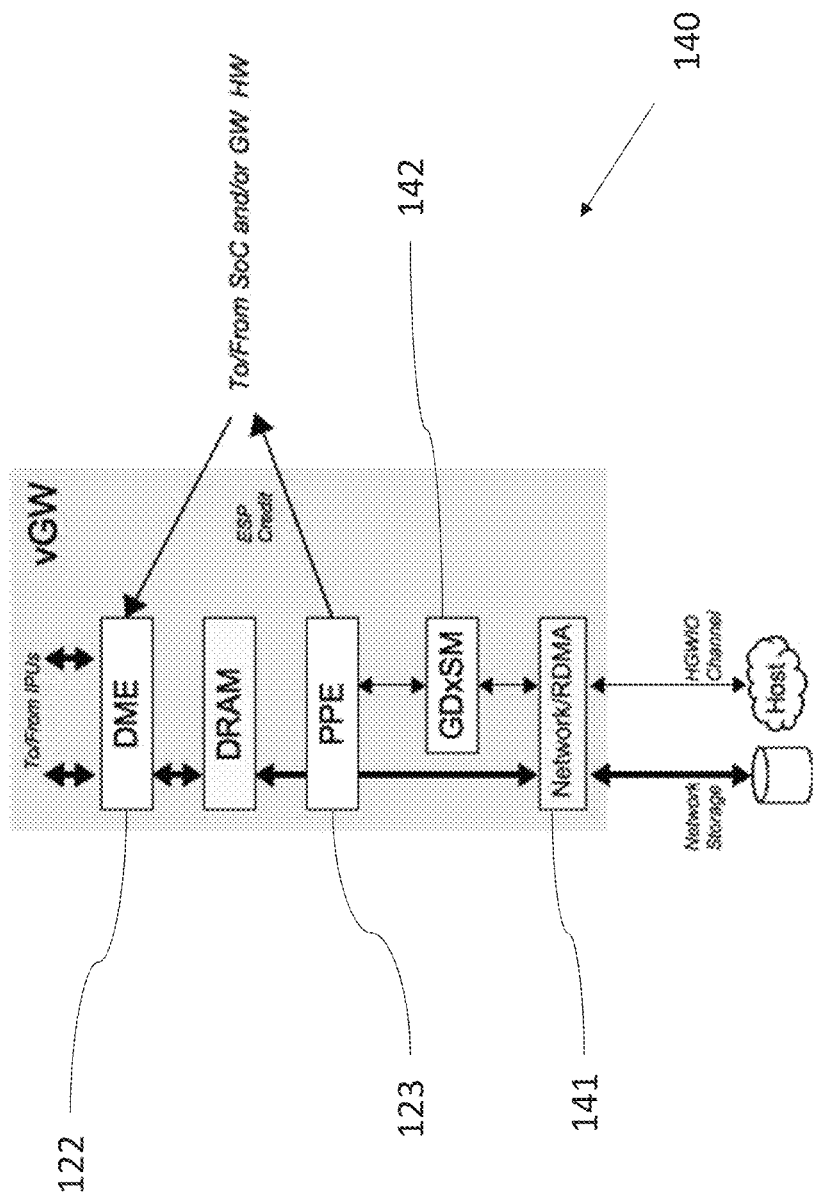
FIG. 10 is a schematic illustration of the data flow through a gateway.

Reference is made to FIG. 10, which illustrates the gateway function that is implemented by the streaming engine 124. The PPE 123 executes in parallel with the DME 122, but as the DME 122 depends upon the results of the PPE 123, the PPE 123 needs to provide its results before a DME operation is scheduled. This is handled in either the executable image, that is pre-compiled, or through user program sequencing of commands delivered to the gateway 52 from the accelerator 51.

As shown in FIG. 10, there is a module 142 (shown as a GDxSM module) that sits between the PPE 123 and the network stack 141. The GDxSM module 142 comprises two modules, i.e. a GW data import synchronisation module (GDISM) and a GW data export synchronisation module (GDESM). Both modules handle synchronization of I/O buffer elements between the gateway, host, and accelerator.

The synchronization is flow-controlled, and ensures GW data consistency and readiness for IO operations at the exchange synchronization points (ESPs). As mentioned earlier, a credit control mechanism is applied so as to keep the three layers (i.e. host, gateway, and accelerator) of the system in sync with each other.

The first set of credits (which has already been discussed in detail) are the ESP credits. The ESP credits govern the passing of the synchronisation barriers either between the accelerator 51 and the gateway 52 or between the gateway 52 and the further gateway 128. Using the ESP credits, a barrier credit mechanism is used to control the transfer of data between the gateway 52 and the accelerator 51. Availability of one ESP credit implies that a data exchange operation can be executed for one barrier.

A second set of credits governs the transfer of data to the gateway 52 (either from the host 63, remote storage 151 or further gateway 128). These credits are stored by the GDxSM 142. More specifically, these credits are stored in the GDISM of the GBxSM 142. The second set of credits may be referred to as GDISM credits. The skilled person would understand that the term "GDISM credits" is a name only, and that the credits are not limited in their nature by this name.

The gateway 52 executes pre-work instructions to retrieve data from the host 63, remote storage 151 or a further gateway 128 in response to determining that there are a non-zero number of GDISM credits available. The gateway 52 does not retrieve the data if it determines that there are zero GDISM credits available. The host 63 sends an instruction to update/increment the GDISM credits using RDMA to send the instruction. When the streaming engine 124 is notified via an RDMA write from host 63 of an update to the GDISM credits register, it will update the credits register accordingly. The gateway 52 decrements the number of GDISM credits stored in response to pre-work being completed by the PPE 123. The pre-work being to transfer data to the gateway 52 from an external storage.

The GDISM credit control mechanism may prevent the pre-work (PRW) instructions from being executed too early. The GDISM controls how many WDs ahead of the currently executing ESP, the pre-work (PRW) engine is allowed to work.

The host 63 may be configured to perform the same credit update for the GDISM credits for a group of gateways. The credit update is performed using RDMA reliable broadcast.

This may be needed in the case that a sync group includes a plurality of gateways. In this case, the group of gateways may need to have the same number of GDISM credits available, otherwise one of the accelerators may stall and hence stop all of the other accelerators.

In some examples, GDISM credits are also used for controlling the transfer of data from the gateway to the host. The same set of GDISM credits (i.e. the second set described above) that is used for the transfer of data from the external storage to the gateway 52 may be used to control the transfer of data from the gateway 52 to the external storage (e.g. host 63, remote storage 151). In response to the gateway 52 sending the data to the external storage, these GDISM credits that represent both import and export credits are decremented when the PPE 123 completes its commands in a WD. The gateway 128 will only transmit data to the external storage if the number of GDISM credits is non-zero.

In this way, the GDISM credits may be used to throttle the POW instructions as well as the PRW instructions. A POW instruction cannot be executed if the number of GDISM credits is non-zero. In the case that GDISM credits control transfer of data both to and from the external storage, a single GDISM credit is consumed only when all the POW instructions and PRW instructions are completed for a given ESP.

In some examples, a third set of credits governs the transfer of data from the gateway 52 to the host 63 or the remote storage 151. These credits are stored by the GDxSM 142. More specifically, these credits are stored in the GDESM of the GBxSM 142. The third set of credits may be referred to as GDESM credits. The skilled person would understand that the term "GDESM credits" is a name only, and that the credits are not limited in their nature by this name.

The gateway 128 will only transmit data to the external storage if the number of GDESM credits is non-zero. In response to the gateway 52 sending the data to the external storage, the GDESM credits are decremented. In this way, the GDESM credits may be used to throttle the POW instructions. A POW instruction cannot be executed if the number of GDESM credits is non-zero. The gateway 52 decrements the number of GDESM credits in response to the completion of a POW instruction.

The host 63 sends an instruction to update/increment the GDISM credits using RDMA to send the instruction. When the streaming engine 124 is notified via an RDMA write from host 63 of an update to the GDISM credits register, it will update the credits register accordingly.

There is a relationship between the GDISM credits and ESP credits. A GDISM credit gives the gateway 52 an allowance to transfer data from host memory to gateway memory 114 for one super-step. When the gateway 52 has loaded the data for this super-step into its memory 114, then it will decrement the GDISM credits and add one credit to the ESP credits. Now, the accelerator 51 can either perform a pull for this data (including a pull according to any pull model) or the gateway 52 can do a push of the data to the accelerator 51 (a push according to any push models) since the LSPM 117 and/or LSBM 118 will acknowledge the sync request when the number of ESP credits is >0.

Figure 9:
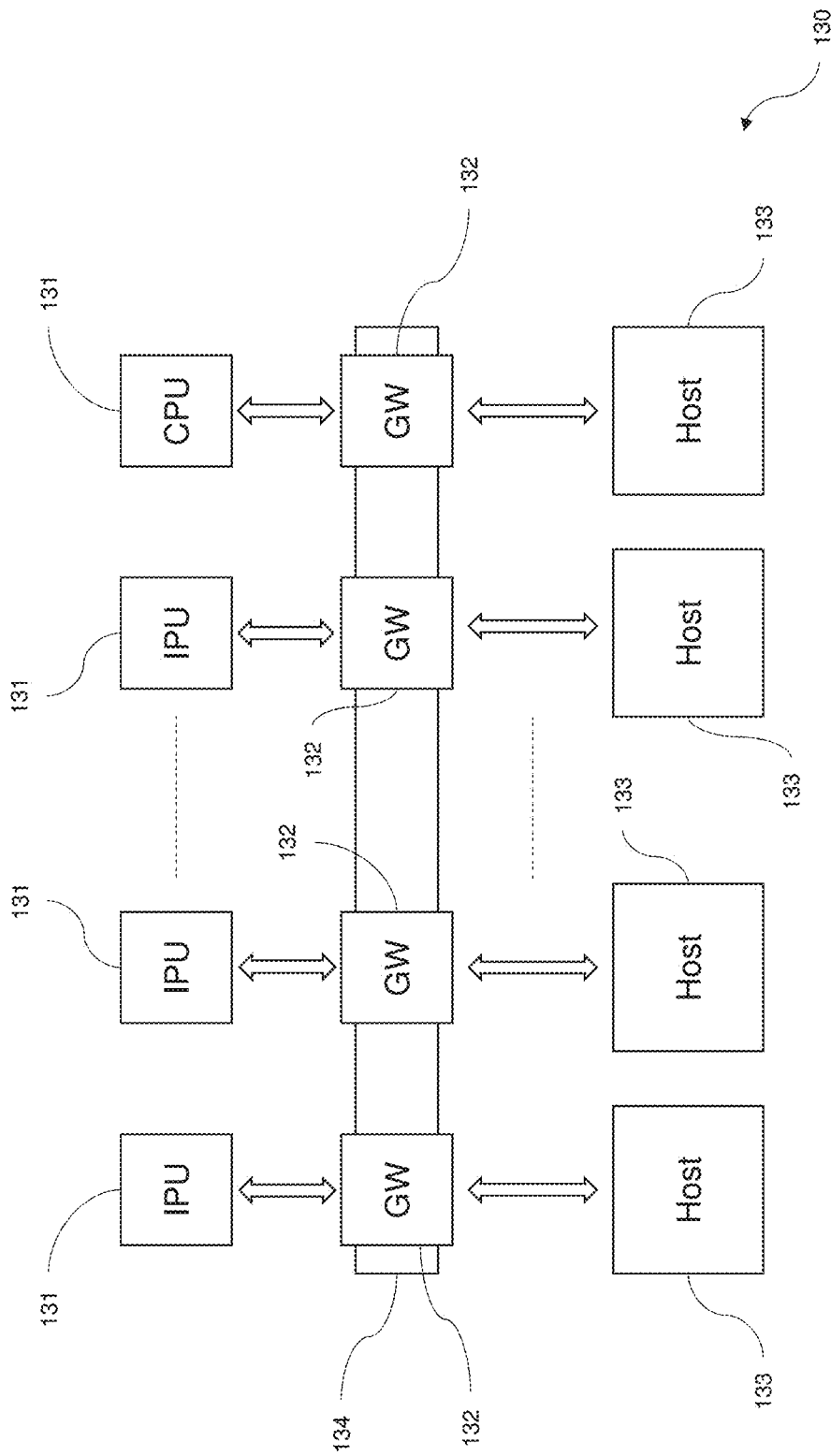
FIG. 9 is a schematic illustration of the different data paths through a gateway.

Reference is made to FIG. 9, which shows an example of a system 130 comprising a plurality of accelerators 131, a plurality of gateways 132 and a plurality of hosts 133. Since the gateways 132 communicate with one another, collectively the gateways 132 form an Ethernet network 134. The communication between the gateways 132 enables the dis- aggregation of the accelerators and the hosts. In other words, any host 133 in the system 130 is able to communicate with any accelerator 131.

Although FIG. 9 shows each gateway 132 being associated with a host 133 with which it communicates, in some embodiments, there is not one host per gateway. In some embodiments, only one of the gateways 132 shown in FIG. 9 may directly communicate with a host 133. That one host 133 could control a plurality of gateways 134. The gateway coupled to the host may distribute data from the host to the remaining gateways 134. Alternatively, the plurality of gateways 134 may retrieve data from the remote storage 151.

In the case that only one gateway 134 communicates with a host 133, that one gateway 134 may be the only gateway 134 of the plurality of gateways 134 that includes a network interface device. This has the advantage of reducing costs, by reducing the number of components required to construct the remaining gateways. When the remaining gateways provide data to the host, they may first perform data augmentation operations on the data before providing that data to the gateways comprising the network interface device for communicating with the host.

In some embodiments, there are no external hosts 133 in the system 130, but rather the host system runs on one or more of the gateways 134. In this case, the compiler runs on the gateway 134.

In some examples, a gateway 132 receives data from a host 133 and distributes this data to one or more other gateways 132. In other examples, a subset of gateways 132 receive data from one or more hosts 133 and distribute the received data to one or more other gateways. Each of the one or more other gateways 132 may provide the distributed data to its associated accelerator 131. By doing so not all of the gateways 132 need receive data from a host 133. This method could reduce costs since, in this case, not all of the gateways need be provided with full bandwidth. It could also improve efficiency. In some example, each accelerator 131 in a group of accelerators receives and processes identical data. In this case, the data need only be fetched once from a host 133. Therefore, a gateway 132 receives said data from the host 133 and distribute copies of this data to one or more gateways 132, which are each configured to distribute data to their associated accelerator 131. Hence, efficiency gains are realised since the same data need not be fetched from the hosts 133 multiple times. Additionally, this can be combined with the use of the remote storage 151 for retrieval of data by the gateways. The use of the remote storage 151 for retrieval means that the cost reduction can be achieved and the Gateways can have full bandwidth. A host may send storage descriptors to many gateways, which in parallel may act on these descriptors and pull/push data from the remote storage 151 over independent network connections per gateway. This technique scales I/O as a function of the number of gateways.

In some cases, the data that is distributed from a gateway 132 to one or more other gateways 132, is modified at the one or more other gateways 132. For example, the one or more other gateways 132 applies data augmentation to the one or more other gateways 132. This data augmentation is performed by the DME/s in the respective gateway/s. When each of the one or more other gateways 132 has modified the data that it has received, it pushes the modified data to its associated accelerator 131.

The pre-compiled gateway software specifies which accelerators 52 get which of the data held in memory 114 by a gateway 132 from which host. The compiler of the accelerator code determines how to apportion data between the accelerators so as to apportion work between them. The gateway 132 load balances the I/O traffic across the two PCIe ports it has towards each Accelerator.

The gateway and accelerator layers of the system are duplicated in such a way so as to allow for scaling of the system. Reference is made to FIG. 12, which shows an example of an apparatus 161 comprising a plurality of accelerators 162 and a plurality of gateways 163. The apparatus 161 is referred to as a machine 161. The machine 161 comprises four accelerators 162 and two gateways 163. Each of the gateways 163 are also coupled to one or more hosts (not shown).

Figure 13:
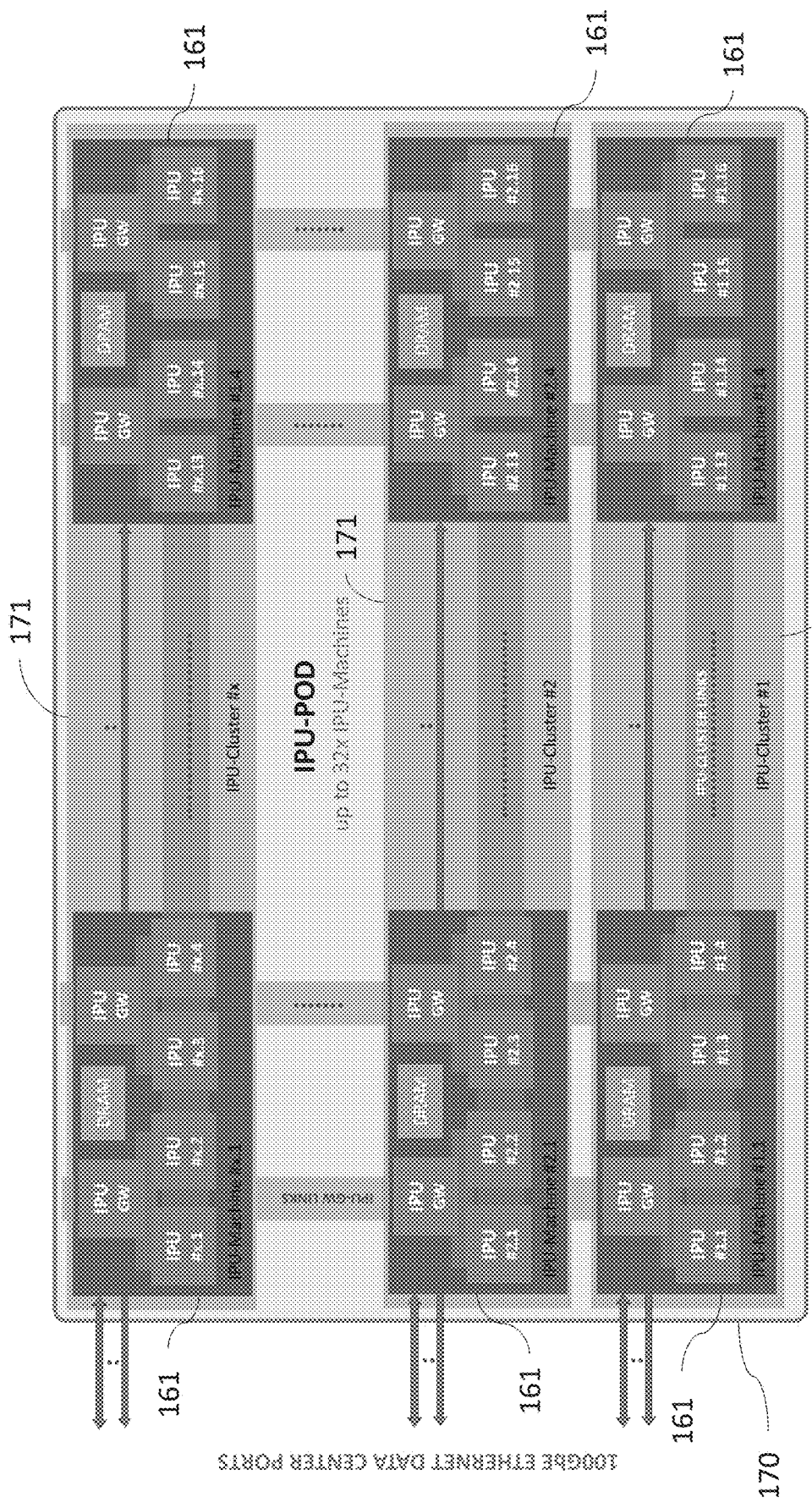
FIG. 13 is a schematic illustration of a pod including a plurality of machines.

Reference is made to FIG. 13, which shows an example of an apparatus 170, comprising a plurality of machines 161 as illustrated in FIG. 12. A plurality of machines 161 are arranged into an apparatus 171, which is referred to as a cluster 171. Each cluster 171 comprises up to 4 machines 161. A plurality of clusters 171 are arranged into an apparatus 170, which is referred to as a pod 171. Each pod 171 comprises up to 32 machines 161. By scaling the system in this manner, a resulting pod 171 comprises 128 accelerators, resulting in system with 16 PFLops and 8 TB of DRAM.

In this model illustrated by FIGS. 12 and 13, each gateway 163 provides a low latency bridge between two or more groups of accelerators 162, allowing accelerators 162 attached to different gateways 163 to communicate with each other as if they were connected on the same internal fabric. Packets are received from an accelerator 162 at the XPU ports (shown in FIG. 8) of a gateway 163. Packets which are targeting memory space that maps to a remote accelerator are detected at the XPU Ports and directed towards the appropriate fabric port (shown in FIG. 8) of the gateway 163. The packet receives at the appropriate accelerator port will be forwarded to the appropriate gateway. From there the gateway will forward the packet to the remote accelerator that is indicated by the memory space targeted by the packet.

Each gateway 163 includes PCIe ports. 4 of these PCIE ports are configured to pass packets to and from accelerators 162. Each PCIe Port (shown in FIG. 12) can be configured to use a different accelerator specific protocol. A custom gateway transaction layer then converts between that protocol and the gateway internal protocol. The custom gateway layer implements the address map, and provides collective and broadcast/multicast offload support. Each gateway 163 provides an address mapping scheme, exposing all participating accelerators 162 in a global address space. The packets received at the gateway 163 from the accelerator 162 contain a gateway ID, identifying the destination gateway to which the packet is to be routed.

The Global Address Space encompasses all accelerators 162 belonging to the pod 170 as well as all of the gateway's 163 memory resources. Accelerators may dispatch packets specifying addresses in the global address space. Some parts of the address are used to select the resources on the target gateway. Some parts of the address are used to identify the gateway which is being addressed. Some other parts are used to identify addresses in the gateway memory or memory in an associated accelerator's tile memory. The accelerator's tile memory is addressable by a tile index and a memory offset. The address may include this tile index and memory offset to identify a location in the accelerator at which data of the data packet is to be stored.

When a packet is received, the identification of the gateway in the address is compared against this gateway's global ID. If there is a match, the request is targeting a resource belonging to this Gateway (a local accelerator or local memory). Otherwise, the part of the address are used to index a Routing Table. The contents of the Routing Table indicate the target port in the system. Some bits of the address will be matched against the GW Routing Table to determine where to route the packet.

The ingress packet pipeline is intended to be a cut-through pipeline with no buffering other than pipeline stages necessary to implement the required features. Packets are first classified by type: Multicast/Broadcast, Collective and Unicast/Memory Writes. These are then split out to individual blocks for processing. The gateway 52 may comprise a unicast module for processing unicast packets and a multicast grouping table. The unicast packet routing table is used by the gateway 52 to perform routing of unicast packets, i.e. those directed to a single accelerator. The incoming address is decoded and selected bits are used to determine the destination. This is a two-step process: first the gateway ID bits are used to determine if this packet targets this gateway. If not, then the gateway ID bits are used to index a Routing Table which returns the output Fabric port for this packet.

If the packet is targeting the gateway 52, then local address bits in the packet address are used to lookup in a set of local Gateway Base Address Registers (BARS) consisting of a plurality of regions, i.e. one BAR for Gateway memory and one BAR for each accelerator port. If the local address bits indicate that the packet is for storage in Gateway memory, e.g. memory 114, the packet is stored in the Gateway memory according to the address in the BAR for Gateway memory. If the local address bits indicate that the packet is for delivery to the accelerator, then the packet is forwarded to the DME 122 of the gateway 52. From there the data packet may be forwarded to the accelerator according to the address in the BAR for the relevant accelerator port.

Packets specifying the multicast/broadcast service are processed at the multicast group table. Each Fabric port has its own table with a list of ports which will get a copy for each group (including broadcast). There are three sets of destinations. Firstly, packets are sent to the local accelerators if, and only if, the packet belongs to the same vFabric as the Gateway. Secondly, all incoming broadcast/multicast packets are checked against the Fabric table to see if they must be forwarded. Thirdly, a copy will be sent to local DRAM. Once the destination port vector is built, the vector and the packet are forwarded to the switch interconnect, which provides the replication service.

Embodiments provide for the virtualisation of resources in a system so as to enable flexible sharing of resources in a system of gateways and accelerators. The virtualisation enables the sharing of a gateway between different external data sources (e.g. hosts or NAS) and accelerators, and also between different accelerators allocated to perform processing for different tenants. The virtualisation enables accelerators and external data sources to be elastically allocated so as to adjust the ratio of external data sources to accelerators as required.

Figure 16:
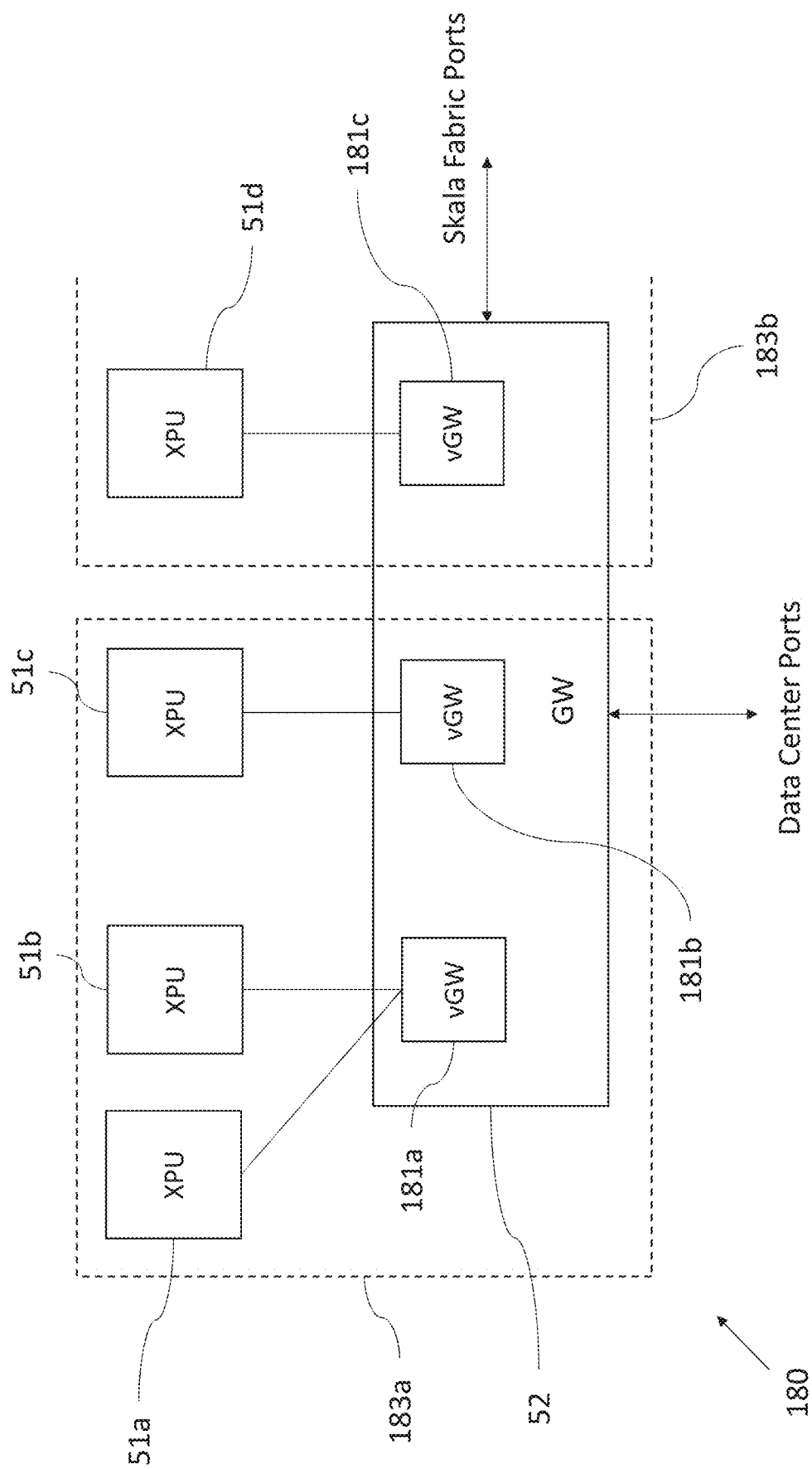
FIG. 16 is a schematic illustration of a system with a gateway have multiple virtual gateways.

Reference is made to FIG. 16, which illustrates a system having virtualised gateways and accelerators.

The gateway 52 comprises a plurality of virtual Gateways (vGWs). Each of the vGWs is a virtual machine or container providing a set of isolated run-time resources to at least one accelerator.

Each vGW is a virtualised instance of a physical gateway that individually performs the streaming operations described above as being performed by the gateway 52. The vGW is associated with assigned hardware resources of the gateway, such as CPU/s, memory, network bandwidth, streaming engines, synchronisation modules. These resources are all made available through virtualized, partitioned and isolated software or hardware representations.

As shown in FIG. 16, the fabric 180 is divided into different virtual fabrics (vFabrics) 183a, 183b. Each of the vFabrics 183a, 183b is allocated to perform processing for one of multiple tenants. The vFabric 183a is configured to perform processing associated with a first tenant, whilst the vFabric 183b is configured to perform processing associated with a second tenant.

The Gateway 52 supports any arbitrary virtualization configuration. All of the accelerators of the fabric 180 may be part of the same vFabric, or all may be part of different vFabrics and any combination in between.

The concept of a vFabric is introduced in order to allow the fabric of gateways and accelerators to be allocated for use by different tenants. The fabric 180 is the physical collection of interconnected gateways (including fabric links, and any fabric switches) and accelerators. A vFabric is a virtualised sub-partition of the fabric that is isolated from other virtualised fabric entities. It may include only one vGW, but will normally include multiple vGWs. A vGW of the vFabric may receive data packets from the host that are destined for delivery to any recipient within a vFabric. The vGW, which receives these data packets, is a router for these packets.

In some embodiments, each vFabric consists of 1 to N accelerators and 1 to N/2 Gateways.

Two different types of vFabric may be defined. A first type of vFabric does not use the gateway fabric ports for communication between physical gateways. Each gateway will only communicate with its associated accelerators and associated host/network attached storage. Nevertheless, the first type of vFabric still uses ports for communication between vGWs within a physical gateway. vFabrics below a predefined size, e.g. N<32, may be vFabrics of the first type. A second type of vFabric uses the gateway fabric ports for communication between gateways. vFabrics above a predefined size, e.g. N≥32, may be vFabrics of the second type.

Each vFabric is assigned a vFabric ID, which is used to isolate that vFabric from other vFabrics. Each gateways has one or more registers (e.g. a control and status registers (CSRs)), storing the vFabric ID for each of the vGWs of the gateway. When a packet is received at a gateway from an accelerator belonging to a given vFabric, the ID of that vFabric is inserted into that data packet. Data packets transmitted within the vFabric along the Fabric ports, therefore, include the vFabric ID.

When a data packet is received at an accelerator interface of the gateway for sending to the accelerator, the vFabric ID of the packet is checked against a vFabric ID (which is stored in a register at the interface) of the vFabric to which the accelerator belongs. The vFabric ID is checked and removed from the data packet. The packet is only transmitted to the accelerator if the vFabric ID for the accelerator matches the vFabric ID stored in the packet. Otherwise, the packet is dropped and the error is logged. In this way, the separation between vFabrics is enforced, since a gateway will not pass packets of a vFabric to an accelerator that belongs to a different vFabric.

Accesses to the memory of a gateway, e.g. memory 114 shown in preceding Figures, are also subject to a vFabric ID check. Since a gateway may be divided between different vFabrics by employing vGWs, each gateway may have a plurality of memory regions defined, one for each of the vFabrics between which the gateway is divided. The gateway has a portion of its memory (e.g. memory 114 shown in the preceding Figures) reserved as a resource that can be shared among vGWs running on the gateway. This memory is partitioned into different memory regions, each associated with a different vFabric. The memory regions of each vFabric are isolated from memory regions assigned to other vFabrics in the same physical gateway. vGWs belonging to a particular vFabric are able to access the memory region associated with that vFabric, but are unable to access the memory region associated with other vFabrics.

The gateway is configured to store indications of an address range for a memory region assigned for use by a first vFabric and an indication of an address range for a memory region assigned for use by a second vFabric. An access to a particular memory region is only authorised if the vFabric ID associated with the access request (e.g. the vFabric ID contained in a data packet received at the gateway, containing data to be written to the gateway memory) matches the vFabric ID for that memory region. If the vFabric IDs do not match, the memory access is not permitted.

In addition to the vFabric ID, which identifies the vFabric, each of the components (i.e. gateways and accelerators) of a vFabric are allocated a virtual ID (vID). The vD for each component uniquely identifies that component within the vFabric. The set of vIDs for a vFabric numbers the gateways from 0 to N/2-1. The set of vDs for a vFabric numbers the accelerators from 0 to N-1 (where N is the number of accelerators in the vFabric). The assignment of vIDs to physical devices (i.e. GWs and accelerators) is done by configuration software prior to exposing the fabric to the tenant. The assignment can be done in any arbitrary way.

In order to map vIDs to physical IDs, and thus route incoming packets to the correct component (i.e. gateway or accelerator), each gateway owns a copy of a virtual mapping table for its vFabric. A copy of the virtual mapping table is provided for each accelerator port of each gateway. The table is indexed by the vD, contained in the address of a packet received at the gateway. Each entry contains an output port, and a physical gateway ID, which are placed in the packet in response to finding a match between a corresponding entry and the vID in the packet.

When data for a gateway is received at an interface of that gateway, the interface is configured to route the data to the appropriate vGW associated with the external data source or accelerator from which the data was received. For example, data received at an accelerator interface from a particular accelerator is routed, by the accelerator interface, to the vGW associated with the accelerator (i.e. the vGW configured to interface that accelerator with an external data source). As another example, data received at a data connection interface from a particular external data source (e.g. host) is routed, by the data connection interface, to the vGW (i.e. the vGW configured to provide data from that external data source to an accelerator) associated with the external data source. Each of the vGWs is allocated a vID, and the interfaces route the data to the appropriate vGW in dependence upon the vD contained in the data.

The fabric partitioning into vFabrics is performed prior to the compilation process that generates the code to be loaded as an executable image to be executed on the gateway. The compilation process is performed on the basis of a predefined topology description of the specific vFabrics. The virtual addresses (vIDs) are assigned and the appropriate gateway registers are configured to allow the vFabric to operate. The system is configured to then provide vGW and accelerator topology information to the compiler. The compiler may receive the topology information either through online discovery during the compilation process itself or from a topology file generated prior to the compilation process to allow for offline compilation. The compiler is configured to produce the code loadable as an executable image for execution by the gateway streaming engines and accelerators within the vFabric in dependence upon this provided information.

Each vFabric has certain resources allocated that are suitable for the needs of its associated tenant. The resource allocation for a tenant is determine by privileged management software (the management system) running on one or more of the gateways or elsewhere. The resource allocation is not fixed but can be adjusted dynamically during runtime. Such adjustments may be performed so as to meet the changing needs of the tenants running on the system. The adjustments may also enable the migration of accelerators from one vGW to another or the migration of external data sources from one vGW to another. As well as modifying the resource allocation between vFabrics, such changes may also be made so as to adjust the external data source to physical accelerator ratio.

As noted, each vGW includes resources enabling it to perform the operations to transfer batches of data between an external data source and an accelerator, described above as being performed by a physical gateway 52. The resources allocated to a vGW include the streaming engine(s) for data movement between the accelerators and external storage (e.g. the host 63).

The resources for a vGW include a GDISM module which, as already discussed, stores a set of credits for controlling data importation from external storage. At least one host 63 coupled to the gateway 52 is configured to separately control the credits for each vGW of the gateway 52. A separate host may be provided to control the credits for each of two or more vGWs of the gateway 52. A single host may control the credits for two or more vGWs of the gateway 52. A single host may control the credits for all of the vGWs in the vFabric. When a single host controls the credits for two or more vGWs, the host adds a credit to each set of credits for the vGWs by making a broadcast (RDMA send) to those two or more vGWs. The resources may also include seperate GDESM modules for each vGW, which as already discussed, stores a set of credits for controlling data export to external storage.

The resources of a vGW include seperate LSPM and LSBM (which are discussed above with respect to FIG. 7). Therefore, the ESP credits are stored and used to control sync barriers on a vGW level. The sync propagation is additionally carried out on vGW level, with each vGW being configured to receive sync requests at its LSPM from its associated at least one accelerator and determine whether to propagate the sync request, return a sync acknowledgment, or prevent the sync from proceeding.

When a sync request is received at an interface of the gateway, the interface is configured to route the sync request to the appropriate vGW associated with the accelerator from which the sync request was received. For example, a sync request received at an accelerator interface from a particular accelerator is routed, by the accelerator interface, to the vGW associated with the accelerator (i.e. the vGW is configured to provide data to that accelerator from an external data source). As mentioned, each of the vGWs is allocated a vD, and the interfaces route the sync request to the appropriate vGW in dependence upon the vID contained in the sync request. When the sync request is received at the vGW, the LSPM determines whether to propagate the sync request, return a sync acknowledgment or prevent the sync from proceeding.

A control channel is established between each vGW and a host connected to the gateway. This enables one or more hosts (and therefore the tenant) to control the execution environment of the vGW steaming engines on an individual level.

Figure 20:
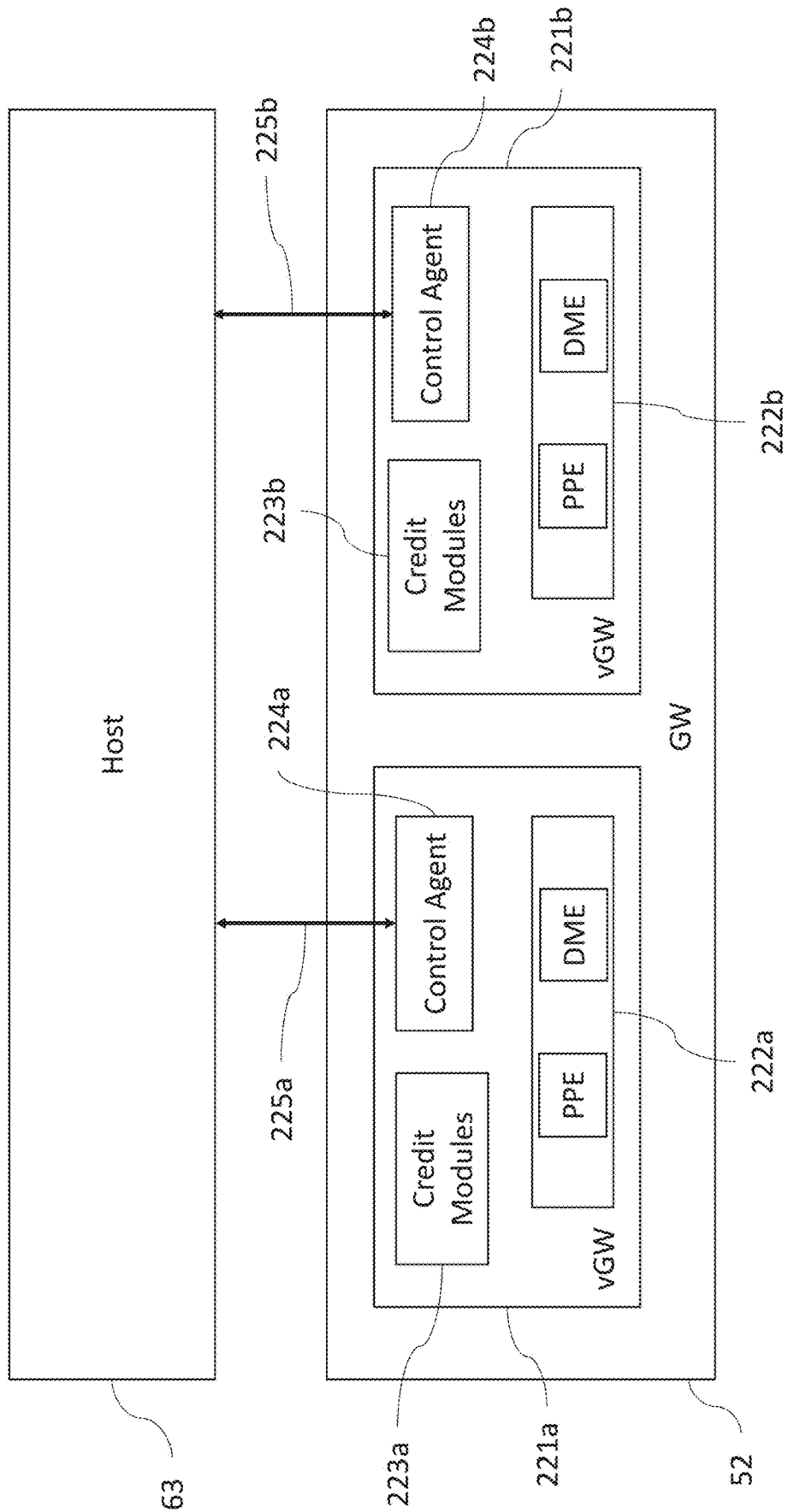
FIG. 20 is a schematic of illustration of a host and a gateway, wherein the host sends control information to virtual gateways of the gateway.

Reference is made to FIG. 20, which illustrates the use of control channels for controlling resources of the vGWs. The physical gateway comprises vGWs 221a, 221b, each having a control agent 224a, 224b, which receives control information from the host 63 (or, in some embodiments, from separate hosts) via a control channel (or control plane) 225a, 225b. This give the host 63 control over the resources assigned to a VGW to be used by a tenant. The host 63 by sending instructions along the control channel 225a, 225b has control over the gateway preparation phase, the program execution phase and the termination phase after the execution has ended. The control channel 225a, 225b for each vGW 221a, 221b has control over the streaming engine/s 222a, 222b of the respective vGW.

The host 63 stores for a vFabric, a "GW data import ack" (GDIACK) object that represents feedback to the host 63 that host buffers for a given synchronisation point have now been consumed (i.e. the corresponding data has been transferred to the gateway 52 from the host 63) and can be reused by the host 63 for supplying data to the gateway 52. A streaming engine is configured to inform the host (i.e. send a GDIACK) as to work descriptor completion progress. A vGW 221a, 221b will periodically report to the host 63 by doing an RDMA send to a GDIACK object, informing the host 63 as to the WD the accelerator is currently executing. When it receives updated GDIACK information, the host 63 will prepare data in host memory for the next N WDs. The reporting interface may be controlled using the control channels 225a, 225b In the case that a vGW comprises a plurality of streaming engines (which, as will be explained, are used to allow the vGW to communicate with a plurality of accelerators in parallel), the host 63 sends information along a particular control channel 225a, 225b to select which streaming engine of the vGW is configured to update the host as to WD completion progress.

FIG. 20 illustrates the credit modules 223a, 223b for each vGW. The credit modules includes the GDISM, GDESM, and LSBM. The control channels 225a, 225b are used for determining whether or not the GDISM is enabled so as to control data import. Although a vGW may comprise a plurality of streaming engines, a single set of credits in the GDISM, that controls data import from external data storage, is shared amongst the streaming engines of a vGW.

The sync master and sync slaves for propagated sync requests and acknowledgments up and down the chain of gateways, as described above, are defined on vGW level. A sync master vGW is defined in the vFabric along with one or more sync slave vGWs when propagating sync requests/acknowledgments. The control channels 225a, 225b are also used for select which vGW is the sync master. By default all vGWs are configured as sync masters. The host 63 transmits an instruction via the relevant control channel to select one of the vGWs in the vFabric to be the sync master vGW.

In the example shown in FIG. 16, each of the vGWs is configured to interface one or more accelerators with an external data source (e.g. host 63). vGW 181a is configured to interface the accelerators 51a and 51b with the host 63. The vGW 181a is, therefore, configured to provide data (e.g. by executing instructions to stream data) from external storage to the accelerators 51a and 51b in parallel. In order to provide data to two or more accelerators in parallel, the vGW 181*a* is provided with two or more streaming engine instances. A first streaming engine instance of the vGW 181*a* is configured to provide data from external storage to accelerator 51*a*, and a second streaming engine instance of the vGW 181*a* is configured to provide data from external storage to accelerator 51*b*. Therefore, when a vGW provides data to a plurality of accelerators, a separate streaming engine instance is used for each accelerator.

The vGW 181*b* is configured to interface the accelerator 51*c* with a host. The vGW 181*b* is, therefore, configured to execute instructions using a streaming engine to provide data from external storage (which may be the host itself) to the accelerator 51*c*. The vGW 181*c* is configured to interface the accelerator 51*d* with a host. The vGW 181*c* is, therefore, configured to provide data (e.g. executing instructions using a streaming engine) from external storage to accelerator 51*d*.

Each vGW is able to supply data to a plurality of accelerators by executing in parallel, code loadable as an executable image for each of the plurality of accelerators. For example, vGW 181*a* comprises two streaming engines, each of which is configured to execute one of two copies of the code loaded as an executable image. One copy is executed for streaming data to the accelerator 51*a* and another is executed for streaming data to the accelerator 51*b*.

The streaming between the vGW and its associated accelerator/s could be done using the push or pull model discussed above.

The vGWs 181*a*, 181*b* are part of a first vFabric 183*a*. Therefore, the accelerators 51*a*, 51*b*, 51*c* associated with these vGWs are also part of the first vFabric 183*a* and are configured to perform processing for a first tenant to which the first vFabric 183*a* is allocated. The vGW 181*c* is part of a second vFabric 183*b*. Therefore, the accelerator 51*d* associated with this vGW 181*c* is also part of the second vFabric 183*b* and is configured to perform processing for a second tenant to which the second vFabric 183*b* is allocated. The second vFabric 183*b* comprises at least the vGW 181*c* and accelerator 51*d*. The second vFabric 183*b* may or may not comprise additional vGWs (which would be part of physical gateways other than gateway 52) and accelerators.

The assignment of the resources in the system shown in FIG. 16 may be performed by a management system, which may run on at least one of the gateways or elsewhere or on a trusted management host. The management system is configured to control the gateways to provide the vGWs and to control the assignment of accelerators and hosts to particular vGWs.

Figure 17:
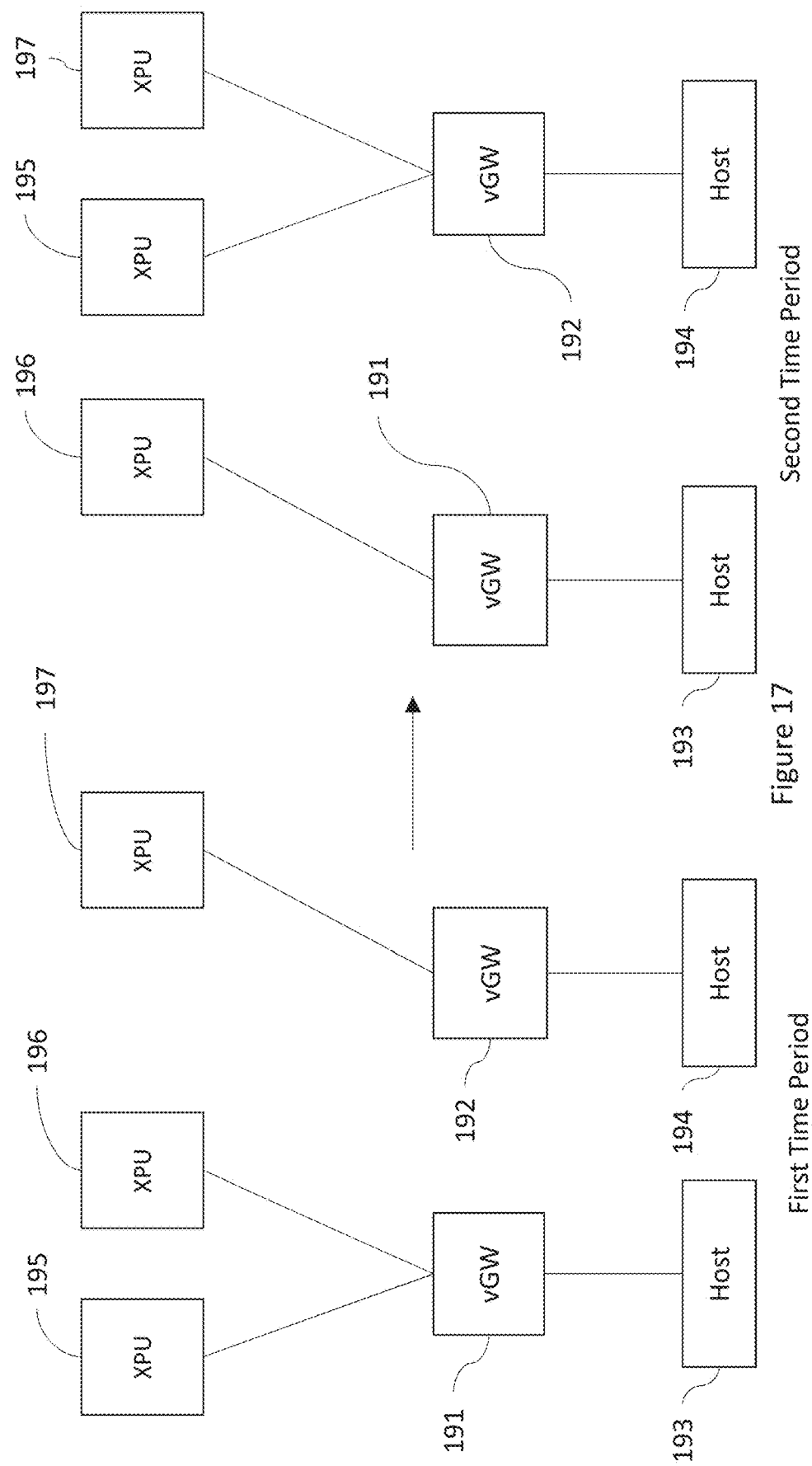
FIG. 17 is an illustration of the migration of an accelerator from one virtual gateway to another.

Reference is made to FIG. 17, which illustrates how an accelerator may be migrated from one vGW to another vGW. During a first time period, a first vGW 191 is configured to interface accelerators 195 and 196 with host 193. The first vGW 191 is configured to provide data from external storage associated with host 193 to accelerators 195 and 196 during the first time period. Also, during the first time period, a second vGW 192 is configured to interface host 194 with accelerator 197. The second vGW 192 is configured to provide data from external storage associated with host 194 to the accelerator 197 during the first time period.

The first vGW 191 and second vGW 192 may belong to the same physical gateway. Alternatively, the first vGW 191 and second vGW 192 may belong to different physical gateways.

FIG. 17 shows how an accelerator 195 is migrated from the first vGW 191 to the second vGW 192. As a result of this migration, during a second time period, the second vGW 192 is configured to interface the host 194 with accelerator 195. The second vGW 192 is configured to provide data from external storage associated with host 194 to the accelerator 195 during the second time period. The first vGW 192 is configured to no longer provide data to the accelerator 195 during the second time period.

The migration of an accelerator from one vGW to another vGW enables accelerators to be migrated between different hosts. This can be used to change the host to accelerator ratio or the ratio between NAS storage and accelerators. The migration of an accelerator may involve migrating the accelerator to a different vFabric. This allows accelerators to be dynamically allocated for use by different tenants in response to changing tenant requirements.

The migration of the accelerator between vGWs occurs in response to an instruction from a management system. The management system issues at least one instruction that causes the first vGW 192 to disconnect from the accelerator 195 and the second vGW to connect to the accelerator 195.

For example, the first vGW 191 may belong to a first vFabric serving a first tenant and be configured to provide data to accelerators serving the first tenant. The second vGW 192 may belong to a second vFabric belong to a second tenant and be configured to provide data to accelerators serving the second tenant. During the first time period, the accelerator 195 is configured to perform processing for the first tenant. A management system, which may run on one of the accelerators or on other component of the system, determines, based on the relative requirements of the first tenant and the second tenant, that an accelerator should be migrated from the first tenant so as to perform processing for the second tenant instead. In response to this determination, the accelerator 195 is migrated from the first vGW 191 to the second vGW 192 so as to perform processing for the second tenant.

Figure 18:
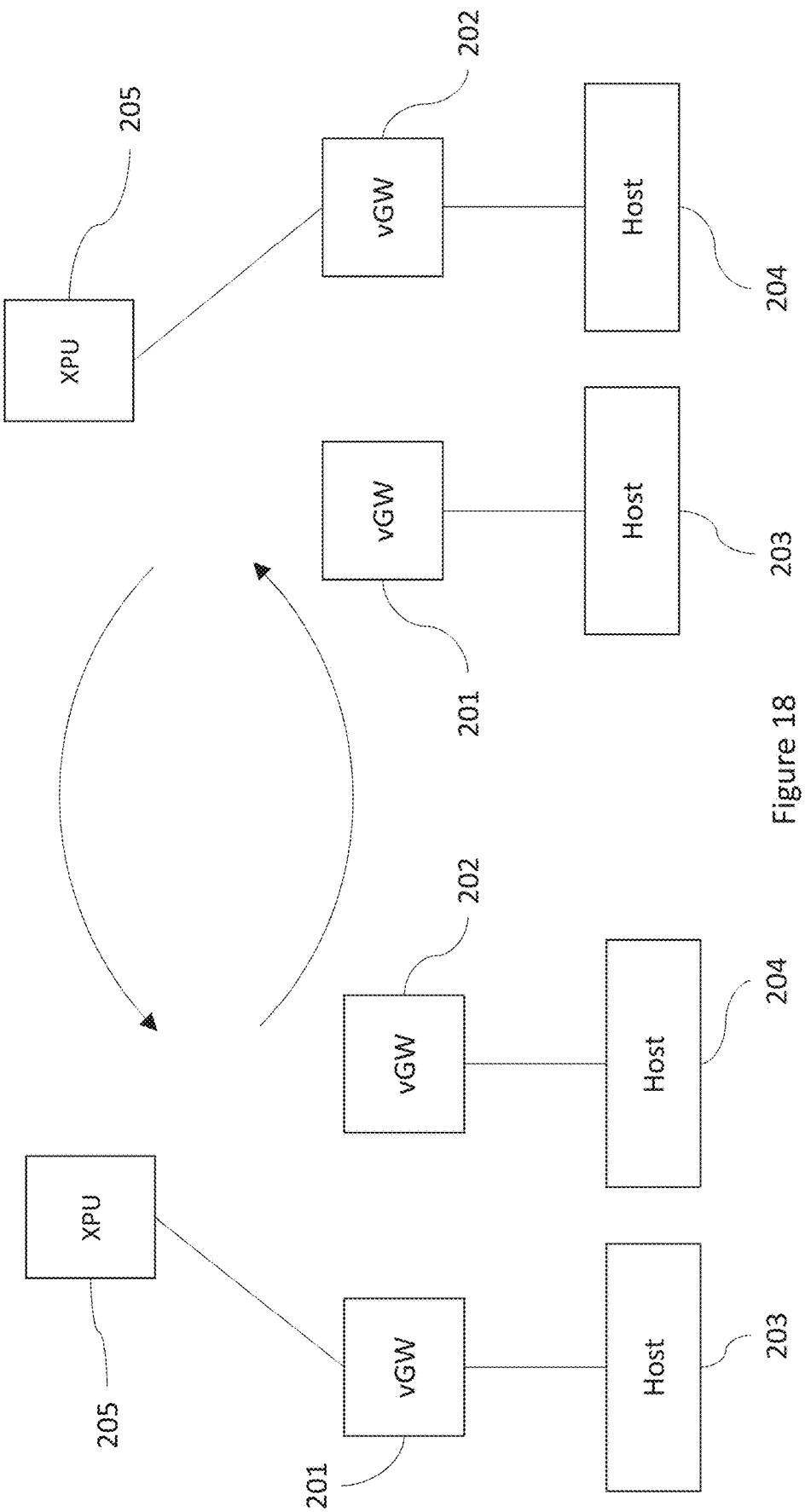
FIG. 18 is an illustration of the time sharing of accelerator between virtual gateways.

In some embodiments, time sharing of an accelerator between hosts may be implemented. Reference is made to FIG. 18, which illustrates how time sharing of an accelerator may be implemented. The first vGW 201 and second vGW 202 that are shown in the Figure may belong to the same physical gateway or to different physical gateways.

As shown, the first vGW 201 is initially configured to interface accelerator 205 with host 203. During this time period, the first vGW 201 provide data from external storage associated with host 203 to the accelerator 205. At a later time, the second vGW 202 interfaces the accelerator 205 with host 204 and provide data from external storage associated with host 204 to the accelerator 205. Then at even later time, the first vGW 201 again provides data from the external storage associated with the host 203 to the accelerator 205. This switching of the accelerator 205 between the different vGWs and, therefore, between the different hosts continues so as to continually switch the host that is responsible for supplying data to the accelerator 205. The accelerator 205 is thus dynamically switched between the two vGWs 201, 202 during runtime so that its processing resources are time shared between the hosts 203, 204.

This time sharing enables a single accelerator to be shared between different hosts. It also enables a single accelerator to be shared between different tenants in the case that the vGWs 201, 202 belong to different vFabrics.

The time sharing of the accelerator between vGWs is controlled by the management system. The management system issues at least one instruction that causes the accelerator 205 to be shared between the first vGW 201 and the second vGW 202. Additionally or alternatively, each gateway may schedule the time sharing based on an algorithm separate to the management system.

When the accelerator 205 is time shared between the vGW 201 and vGW 202, the accelerator's 205 state is saved and then restored repeatedly. The accelerator 205 may be configured to perform processing of data provided to it by vGW 201 and to generate associated state information. Prior to switching to perform processing of data provided by vGW 202, the accelerator 205 is configured to save the state associated with the processing performed for vGW 201. When the accelerator 205 again switches to performing processing for vGW 201, the accelerator 205 restores this state. The save/restore process is also performed for the state associated with the processing of data provided by vGW 202.

The accelerator 205 is configured to save its state associated with the processing of data from one of the vGWs 201, 202 in response to a save state command received from the respective vGW. The accelerators 205 is configured to restore its state associated with the processing of data from one of the vGWs 201, 202, in response to a restore command received from the respective vGW.

The processing that accelerator 205 is configured to perform for data received from vGW 201 may be for a different tenant than the processing that is performed for data received from vGW 202. If the tenants of vGW 201 and vGW 202 are different, the vFabrics will also be different. The processing will likely, therefore, also be according to a different model.

Therefore, when the accelerator 205 switches between vGWs 201, 202, the accelerator 205 is configured to load the new model to run. To switch between different vFabrics, the accelerator link configuration registers will be reconfigured. The sync port configuration registers will also be reconfigured.

In the case that the vFabric and sync network settings for the tenants of vGW 201 and 202 are the same, the model loading steps may be omitted, with only the state save/restore steps being performed for the switching.

As well as migrating accelerators between different vGWs, it is also possible to migrate external data sources (e.g. hosts) between different vGWs.

Figure 19:
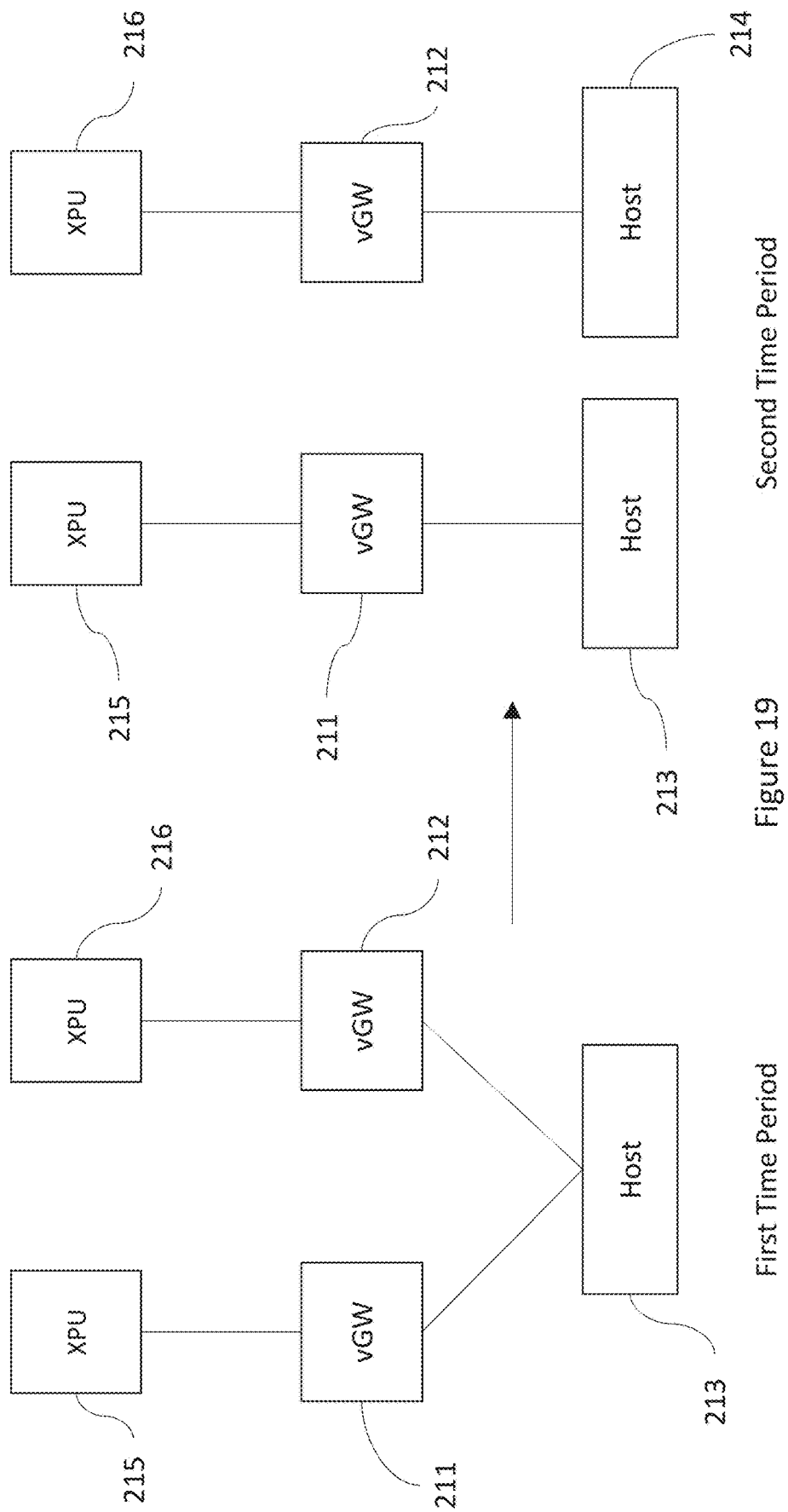
FIG. 19 is an illustration of the connection of virtual gateway to a new host.

Reference is made to FIG. 19, which illustrates a migration of external data sources according to embodiments of the application. In the Figure, the external data sources are shown and described as hosts. However, in some embodiment, the external data sources may be other forms of storage (e.g. NAS). The first vGW 211 and second vGW 212 may belong to the same physical gateway or may belong to different physical gateways.

During a first time period, the first vGW 211 is configured to interface accelerator 215 with host 213. The first vGW 211 is configured to provide data from external storage associated with host 213 to accelerator 215 during the first time period. Also, during the first time period, the second vGW 212 is configured to interface the same host 213 with accelerator 216. The second vGW 212 is configured to provide data from the external storage associated with host 213 to the accelerator 216 during the first time period.

A further host 214 is then connected to the vGW 212, such that the vGW 212 is configured to interface the host 214 with the accelerator 216. During the second time period, the vGW 212 is configured to interface the host 214 with the accelerator 216 and provide data from the external storage associated with host 214 to the accelerator 216. The host 213 is configured to continue to provide data to the accelerator 215 through the vGW 211 during the second time period.

The migration of the host between vGWs occurs in response to an instruction from a management system. The management system issues at least one instruction that causes the second vGW 212 to connect to the further host 214.

By migrating hosts between vGWs, embodiments of the application may allow the host to accelerator ratio to be modified. This may be performed so as to allocate resources between different tenants according to the relative requirements of the different tenants. For example, both the first vGW 211 and the second vGW 212 and the respective accelerators 215, 216 may belong to a first vFabric, with the accelerators 215, 216 of this vFabric being configured to serve as accelerator subsystems for the host 213. A system, which runs on one of the gateways, is configured to determine that the requirements of the tenant of the first vFabric are such that an additional host is to be allocated for interfacing with the accelerators 215, 216. Such a determination may be made if additional host processing power is required to pre-process data to be provided to the accelerators. In response to the determination, the further host 214 is allocated to interface the accelerator 216. Hence, an additional host 214 is allocated for providing data to the first vFabric. The additional host 214 may be migrated from a vGW of a second vFabric (not shown) to the vGW 212 of the first vFabric.

The invention claimed is:

1. A system comprising a gateway for interfacing a plurality of external data sources with a plurality of work accelerators, the gateway enabling transfer of batches of data to the plurality of work accelerators at precompiled data exchange synchronisation points,
   wherein the gateway comprises:
     means for connecting to the plurality of work accelerators to enable transfer of data between the plurality of work accelerators and the gateway;
     means for connecting to the plurality of external data sources for exchanging data between the gateway and the plurality of external data sources; and
     means for providing a plurality of containers, each of the containers configured to provide data from one of the external data sources to be received by one of the work accelerators in response to a synchronisation point being obtained by the gateway, wherein the gateway and the plurality of work accelerators are indicated to be synchronized together by data in the gateway;
   wherein the means for providing further comprises means for directing data received from a first one of the external data sources to a first one of the containers associated with the first one of the external data sources.

2. The system of claim 1, wherein the data received from the one of the external data sources comprises a data packet having a virtual identifier,
   wherein the means for directing data directs the data in response to determining that the virtual identifier is associated with the first one of the containers.

3. The system of claim 1, wherein the first one of the containers is configured to, in advance of the synchronisation point, access data from the first one of the external data sources and store the data in a memory of the gateway.

4. The system of claim 1, wherein the first one of the containers is configured to, in response to the synchronisation point being obtained, execute instructions to transfer data from a memory of the gateway to a first one of the work accelerators.

5. The system of claim 1, wherein a first one of the work accelerators is configured to pull data from a memory of the gateway in response to the synchronisation point being obtained.

6. The system of claim 1, wherein the plurality of containers comprises:
a second one of the containers configured to, during transfer of data by the first one of the containers, transfer data to be received at a first one of the work accelerators.

7. The system of claim 1, wherein the means for providing further comprises means for inserting an identification of a first virtual fabric into a data packet received at a first interface from a first one of the work accelerators, wherein the first one of the work accelerators belongs to the first virtual fabric.

8. The system of claim 1, wherein a first one of the work accelerators belongs to a first virtual fabric, wherein the means for providing further comprises:
means for checking that a data packet for delivery to the first one of the work accelerators comprises an identifier of the first virtual fabric.

9. The system of claim 1, wherein a first one of the work accelerators comprises a host device.

10. A computer implemented method for interfacing a plurality of external data sources with a plurality of work accelerators, the method implemented in a gateway, wherein the method comprises:
connecting to the plurality of work accelerators, including enabling transfer of data between the plurality of work accelerators and the gateway;
connecting to the plurality of external data sources, including exchanging data between the gateway and the plurality of external data sources;
providing a plurality of virtual machines, each one of the virtual machines configured to provide data from one of the external data sources to be received by one of the work accelerators in response to a synchronisation point being obtained by the gateway, wherein the gateway and the plurality of work accelerators are indicated to be synchronized together by data in a register of the gateway; and
directing data received from a first one of the external data sources to a first one of the virtual machines associated with the first one of the external data sources.

11. The method of claim 10, wherein the data received from first the first one of the external data sources comprises a data packet having a virtual identifier, and
wherein the directing data is performed in response to determining that the virtual identifier is associated with the first one of the virtual machines.

12. The method of claim 10, further comprising: accessing data, by the first one of the virtual machines, from the first one of the external data sources and storing the data in a memory of the gateway in advance of the synchronisation point.

13. The method of claim 10, further comprising: executing instructions, by the first one of the virtual machines, to transfer data from a memory of the gateway to a first one of the work accelerators in response to the synchronisation point being obtained.

14. The method of claim 10, further comprising: pulling data, by a first one of the work accelerators, from a memory of the gateway in response to the synchronisation point being obtained.

15. The method of claim 10, further comprising: inserting an identification of a first virtual fabric into a data packet received from a first one of the work accelerators, wherein the first one of the work accelerators belongs to the first virtual fabric.

16. The method of claim 10, wherein a first one of the work accelerators belongs to a first virtual fabric, the method further comprising:
checking that a data packet for delivery to the first one of the work accelerators comprises an identifier of the first virtual fabric.

17. A computer implemented method for interfacing a plurality of external data sources with a plurality of work accelerators, the method implemented in a gateway, wherein the method comprises:
connecting to the plurality of work accelerators, including enabling transfer of data between the plurality of work accelerators and the gateway;
connecting to the plurality of external data sources, including exchanging data between the gateway and the plurality of external data sources;
providing a plurality of containers, each one of the containers configured to provide data from one of the external data sources to be received by one of the work accelerators in response to a synchronisation point being obtained by the gateway, wherein the gateway and the plurality of work accelerators are indicated to be synchronized together by data in a register of the gateway; and
directing data received from a first one of the external data sources to a first one of the containers associated with the first one of the external data sources.

18. The method of claim 17, wherein the data received from the first one of the external data sources comprises a data packet having a virtual identifier, and
wherein the directing data is performed in response to determining that the virtual identifier is associated with the first one of the containers.

19. The method of claim 17, further comprising: accessing data, by the first one of the containers, from the first one of the external data sources and storing the data in a memory of the gateway in advance of the synchronisation point.

20. The method of claim 17, further comprising: executing instructions, by the first one of the containers, to transfer data from a memory of the gateway to a first one of the work accelerators in response to the synchronisation point being obtained.

21. The method of claim 17, further comprising: pulling data, by a first one of the work accelerators, from a memory of the gateway in response to the synchronisation point being obtained.

22. The method of claim 17, further comprising: inserting an identification of a first virtual fabric into a data packet received from a first one of the work accelerators, wherein the first one of the work accelerators belongs to the first virtual fabric.

23. The method of claim 17, wherein a first one of the work accelerators belongs to a first virtual fabric, the method further comprising:
checking that a data packet for delivery to the first one of the work accelerators comprises an identifier of the first virtual fabric.

24. A system having a gateway for interfacing a plurality of external data sources with a plurality of work accelerators, the gateway enabling transfer of batches of data to the plurality of work accelerators at precompiled data exchange synchronisation points,
wherein the gateway comprises:

a first interface for connection to the plurality of work accelerators to enable transfer of data between the plurality of work accelerators and the gateway;

a second interface for connection to the plurality of external data sources for exchanging data between the gateway and the plurality of external data sources; and a processor configured to provide a plurality of virtual machines, each of the virtual machines configured to provide data from one of the external data sources to be received by one of the work accelerators in response to a synchronisation point being obtained by the gateway, wherein the gateway and the plurality of work accelerators are indicated to be synchronized together by data in the gateway;

wherein the processor is further configured to direct data received from a first one of the external data sources to a first one of the virtual machines associated with the first one of the external data sources.

25. The system of claim 24, wherein the data received from the one of the external data sources comprises a data packet having a virtual identifier, wherein the processor directs the data in response to determining that the virtual identifier is associated with the first one of the virtual machines.

26. The system of claim 24, wherein the first one of the virtual machines is configured to, in advance of the synchronisation point, access data from the first one of the external data sources and store the data in a memory of the gateway.

27. The system of claim 24, wherein the first one of the virtual machines is configured to, in response to the synchronisation point being obtained, execute instructions to transfer data from a memory of the gateway to a first one of the work accelerators.

28. The system of claim 24, wherein a first one of the work accelerators is configured to pull data from a memory of the gateway in response to the synchronisation point being obtained.

29. The system of claim 24, wherein the plurality of virtual machines comprises:

a second one of the virtual machines configured to, during transfer of data by the first one of the virtual machines, transfer data to be received at a first one of the work accelerators.

30. The system of claim 24, wherein the processor further comprises means for inserting an identification of a first virtual fabric into a data packet received at the first interface from a first one of the work accelerators, wherein the first one of the work accelerators belongs to the first virtual fabric.

31. The system of claim 24, wherein a first one of the work accelerators belongs to a first virtual fabric, wherein the processor further comprises:

means for checking that a data packet for delivery to the first one of the work accelerators comprises an identifier of the first virtual fabric.

* * * * *